(12) United States Patent
Sohr et al.

(10) Patent No.: US 12,315,647 B2
(45) Date of Patent: May 27, 2025

(54) SHIELDING MASK FOR SCATTERED IONIZING RADIATION AND METHOD FOR PRODUCTION THEREOF

(71) Applicants: SCHOTT AG, Mainz (DE); SCHOTT North America, Inc., Rye Brook, NY (US)

(72) Inventors: Oliver Sohr, Mainz (DE); Sebastian Leugner, Gernsheim (DE); Philipp Treis, Bingen am Rhein (DE); Kevin Tabor, Webster, MA (US); Michael Dargie, Southbridge, MA (US)

(73) Assignees: SCHOTT AG, Mainz (DE); SCHOTT NORTH AMERICA, INC., Rye Brook, NY (US)

( * ) Notice: Subject to any disclaimer, the term of this patent is extended or adjusted under 35 U.S.C. 154(b) by 295 days.

(21) Appl. No.: 18/174,517

(22) Filed: Feb. 24, 2023

(65) Prior Publication Data
US 2023/0268092 A1    Aug. 24, 2023

(30) Foreign Application Priority Data
Feb. 22, 2022 (DE) ..................... 10 2022 104 180.8

(51) Int. Cl.
*G01N 23/04* (2018.01)
*C03C 15/00* (2006.01)
(Continued)

(52) U.S. Cl.
CPC .............. *G21F 3/00* (2013.01); *C03C 15/00* (2013.01); *C03C 17/02* (2013.01); *C03C 17/10* (2013.01); *C03C 23/0025* (2013.01); *G01N 23/04* (2013.01); *C03C 2217/70* (2013.01); *C03C 2218/13* (2013.01); *G01N 2223/30* (2013.01)

(58) Field of Classification Search
CPC ........... G21F 3/00; C03C 15/00; C03C 17/02; C03C 17/10; C03C 23/0025;
(Continued)

(56) References Cited

U.S. PATENT DOCUMENTS 2,801,671 A    8/1957   Vaughn
5,581,592 A   12/1996   Zarnoch
(Continued)

FOREIGN PATENT DOCUMENTS

DE   102018110211   10/2019
JP   S5312679        2/1978
(Continued)

OTHER PUBLICATIONS

Lehmann, "MEMS techniques applied to the fabrication of anti-scatter grids for X-ray imaging", Elsevier, Sensors and Actuators A 95 (2002) pp. 202-207.

*Primary Examiner* — Kiho Kim
(74) *Attorney, Agent, or Firm* — Ruggiero McAllister & McMahon LLC

(57) ABSTRACT

A shielding mesh to counter scattered ionizing radiation is provided. The shielding mesh includes a plate, arrangement of depressions, a mesh of trenches, and an x-ray-absorbing material. The plate has a first side and a second side opposite the first side. The arrangement of depressions are in the plate and are open toward the second side. The mesh of trenches are in the plate and are open toward the first side. The x-ray-absorbing material is in the mesh of trenches. The mesh of trenches and arrangement of depressions are configured so that a wall of the plate remains between the arrangement of depressions and the mesh of trenches.

18 Claims, 11 Drawing Sheets

(51) Int. Cl.
*C03C 17/02* (2006.01)
*C03C 17/10* (2006.01)
*C03C 23/00* (2006.01)
*G21F 3/00* (2006.01)

(58) Field of Classification Search
CPC .......... C03C 2217/70; C03C 2218/13; C03C 2217/452; C03C 2217/479; C03C 17/007; G01N 23/04; G01N 2223/30; G21K 1/025; B23K 2103/54; B23K 26/0006; B23K 26/0624; B23K 26/0853; B23K 26/53; A61B 6/06; A61B 6/032; A61B 6/4085
See application file for complete search history.

(56) References Cited

U.S. PATENT DOCUMENTS

| | | | |
|---|---|---|---|
| 2011/0317819 A1 | 12/2011 | Shaw | |
| 2015/0325322 A1* | 11/2015 | Schaepkens | G21K 1/025 |
| | | | 378/154 |
| 2016/0163408 A1 | 6/2016 | Wang | |
| 2019/0329251 A1 | 10/2019 | Ortner | |

FOREIGN PATENT DOCUMENTS

| | | |
|---|---|---|
| JP | 2013181917 | 9/2013 |
| SU | 441019 | 8/1974 |
| WO | 2007034352 | 3/2007 |
| WO | 2022078774 | 4/2022 |

\* cited by examiner

SHIELDING MASK FOR SCATTERED IONIZING RADIATION AND METHOD FOR PRODUCTION THEREOF

CROSS REFERENCE TO RELATED APPLICATIONS

This application claims benefit under 35 USC § 119 of German Application 10 2022 104 180.8 filed 22 Feb. 2022, the entire contents of which are incorporated herein by reference.

BACKGROUND

1 Field of the Invention

The invention relates generally to imaging methods with ionizing radiation, such as, in particular, imaging x-ray methods. More particularly, the invention relates to masks for shielding of a radiation detector from scattered ionizing radiation.

2. Description of Related Art

A known imaging method with ionizing radiation is computed tomography, as used as a radiological method in diagnostics. In this case, an x-ray fan beam is passed through the object to be examined in various planes and directions. It is then possible to use the signals recorded in a spatially resolved manner to reconstruct a three-dimensional model of the object by means of a computer.

One form of computed tomography is digital volume tomography (DVT). In this method, radiation from a very substantially dot-shaped x-ray source is passed through the object and recorded with a matrix detector.

It is advantageous for the signal/noise ratio and hence the resolution and contrast of the tomograms if scattered radiation is blocked before the detector. For this purpose, the use of meshes intended to absorb radiation incident on the detector at an angle to the direct linear path toward the x-ray source is known. An embodiment of such a mesh which is in current use envisages a stack of lead strips, between which there are paper strips as spacers. One disadvantage here is that such a structure suppresses scattered radiation only in one plane, namely at right angles to the surfaces of lead strips. Moreover, such a structure is mechanically not very stable and can be permanently deformed. The construction also generally does not enable fine structuring, which can in turn also affect spatial resolution of the tomograph.

WO 2007/034352 A2 discloses an x-ray absorption mesh in which, in a similar manner, lamellas of x-ray-absorbent material, such as tungsten or molybdenum, are embedded in a rigid foam material and mechanically stabilized by the rigid foam material.

US2016163408 A1 describes the production of an x-ray absorption mesh by means of a silicon substrate. For this purpose, hollows are produced in the silicon substrate by etching, and these are then electrolytically filled with x-ray-absorbing metal.

The x-ray absorption mesh known from U.S. Pat. No. 5,581,592 A is produced by inserting channels into a substrate, preferably made of plastic, by sawing. For this purpose, it is possible to use saw blades as used for division of silicon wafers in chip manufacture. An x-ray-absorbing alloy is then introduced into the channels by melting the alloy. For this purpose, the substrate must be able to withstand the melting temperature without softening.

SUMMARY

It is an object of the invention to provide an improved mesh for shielding of scattered ionizing radiation, especially x-radiation.

Accordingly, the invention provides a shielding mesh to counter scattered ionizing radiation, especially for an imaging x-ray device, for example an x-ray computed tomograph, comprising: a plate having a first side and a second side opposite the first side, wherein the plate has an arrangement of depressions open toward the second side of the plate, and wherein the plate has a mesh composed of trenches that are open toward the first side, wherein the trenches are filled with an x-ray-absorbing material, and wherein the trenches, viewed from one of the sides, run between the depressions and at a distance from the depressions so as to leave walls between the depressions and the trenches.

Viewed in the direction of one of the sides of the plate, the depressions are thus arranged between the trenches. Direct x-radiation can easily pass through the plate at the positions of the depressions. Since the walls of the material of the plate are arranged around the depressions, sufficient mechanical stability is imparted to the plate, even if the x-ray-absorbing material in the trenches is itself not mechanically durable. Since the depressions and trenches open on different sides of the plate and the depressions are thus closed on the side on which the trenches are open, it is possible in a simple manner to avoid simultaneous filling of the depressions as well when the trenches are filled with the x-ray-absorbing material. X-ray-absorbing material in the context of this disclosure refers to a material having a coefficient of x-ray absorption greater at least by a factor of 3 than the x-ray absorption coefficient of the material of the plate for x-radiation with an energy of 69.5 keV. In an alternative or additional preferred embodiment, the x-ray-absorbing material is a material having a density at least four times greater than the density of the material of the plate. For effectiveness as x-ray-absorbing material, the content of elements having a high atomic number in particular is also important. In another alternative or additional embodiment, an x-ray-absorbing material is a material including 10 percent by weight of elements having an atomic number of at least $Z=56$, preferably at least 25 percent by weight, more preferably in a proportion of at least 50 percent by weight of such elements with $Z \geq 56$. In the context of this disclosure, x-ray-absorbing materials also generally include materials that absorb ionizing radiation, especially electromagnetic radiation. Such materials typically also have high absorptivity with respect to particulate ionizing radiation. Therefore, this disclosure generally relates to the shielding mesh mentioned to counter scattered ionizing radiation. In this context, the term "x-ray-absorbing material" is a simplification of all materials capable of absorbing high-energy rays. X-ray-absorbing materials additionally also include x-ray-opaque materials.

The invention is elucidated in detail hereinafter with reference to the figures. Identical reference numerals in the figures relate to respectively identical or corresponding elements.

DETAILED DESCRIPTION

Figure 1:
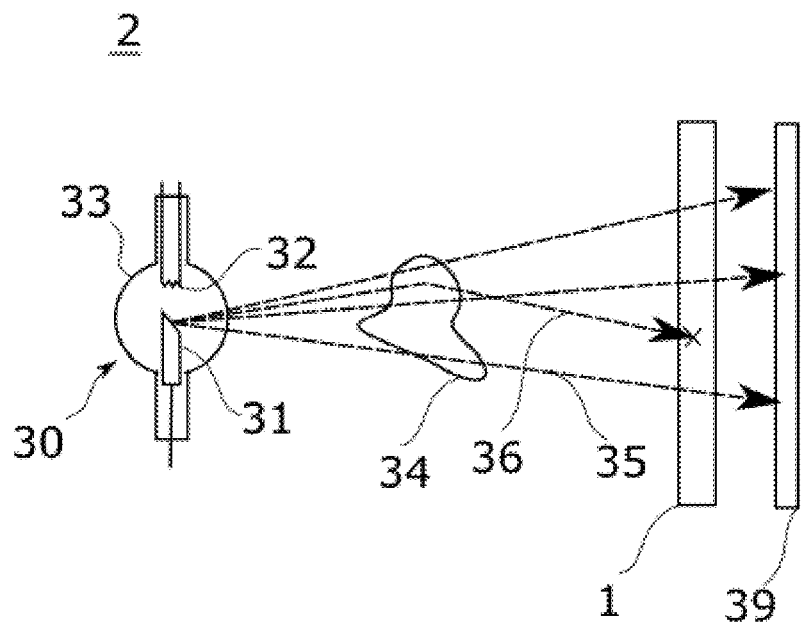
FIG. 1 shows a schematic of a computed tomograph with a shielding mesh.

The invention relates not only to the shielding mesh but also to an imaging x-ray device, for instance a computed tomograph. The imaging x-ray device generally comprises an x-ray source, an x-ray detector, and a shielding mesh 1 disposed in front of the x-ray detector for detection of the x-radiation emitted by the x-ray source. The function of a shielding mesh 1 as envisaged by the invention is elucidated by FIG. 1. FIG. 1 shows a schematic construction of an imaging x-ray device 2. In the embodiment shown, this comprises an x-ray source, especially an x-ray tube 30 with a vacuum envelope 33 and, disposed therein, an anode 31 and a cathode 32. In operation, the anode emits x-rays. An object to be examined, for example a patient or a part of the body, is disposed between the x-ray tube 30 and an x-ray detector 39.

The invention is particularly suitable for what is called cone beam computed tomography. This method does not involve performing a sequential scan with a rotating fan beam, but instead a cone beam emanating from the x-ray source 30 is detected with a matrix detector. Data suitable for the tomogram can be obtained from x-rays 35 passing in a straight line through the object to be examined. Scattered x-rays, by contrast, do not contain any local information and merely increase noise. As apparent from FIG. 1, scattered x-rays hit the x-ray detector 39 at an angle relative to the linear path between x-ray tube and detector. The shielding mesh 1 is intended to allow the x-rays 35 coming in a straight line from the x-ray tube 30 to pass through with minimum attenuation, but to absorb scattered x-rays 34. This is achieved by means of passages which are defined by the interstices in the mesh made of x-ray-absorbing material and allow only beams at a low angle compared to linear passage to pass through.

Figure 2:
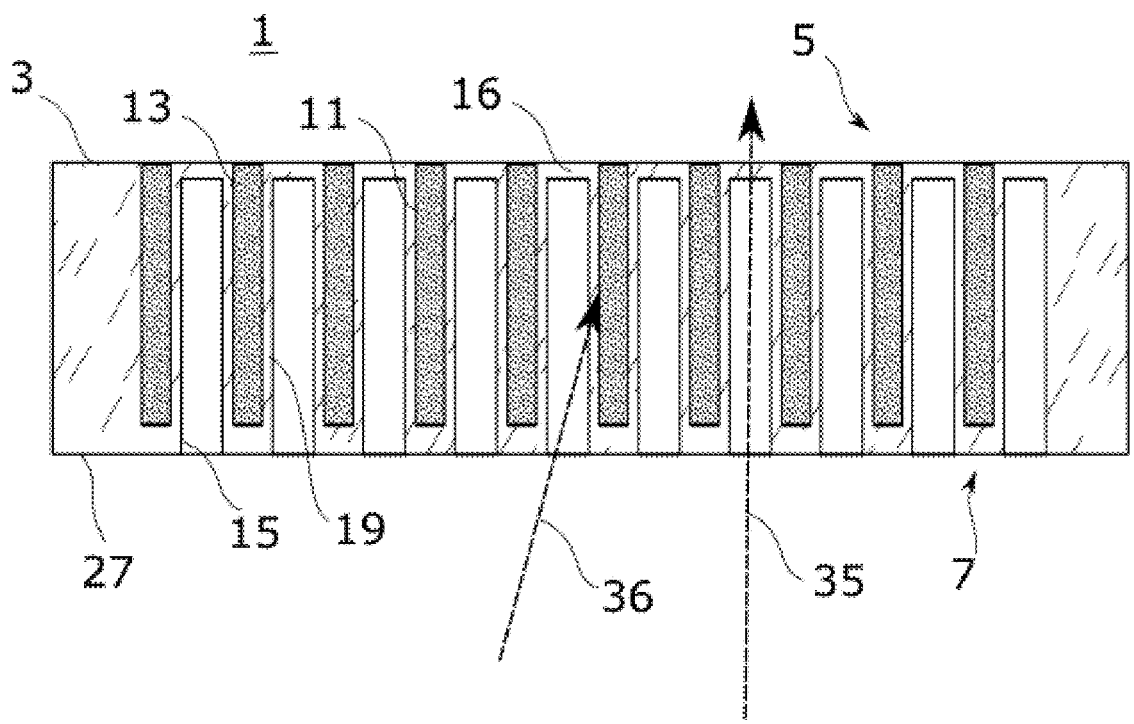
FIG. 2 shows a shielding mesh in cross section.

A shielding mesh 1 is shown in cross section in FIG. 2. The shielding mesh 1 comprises a plate 3 as carrier or base element. In a particularly preferred embodiment of the invention, and without limitation to the example described, the plate 3 is a glass plate. One reason why glass is particularly preferred as the material is that it is not ductile and hence cannot be deformed in a sustained manner on account of mechanical action. This avoids changes in collimating properties, for example selectivity for direct versus scattered x-radiation. Another reason is that glass can now be very finely structured, which likewise facilitates production of a shielding mesh with high selectivity. A further advantage is that selection of a suitable type of glass enables matching of the thermal expansion of the glass. It is thus possible, for example, to minimize temperature-related movements of the mesh with respect to the pixels of an x-ray detector 39. This is also true of comparatively large dimensions. It is therefore envisaged, in one development, without restriction to particular materials of the shielding mesh, that the shielding mesh 1 has an area of at least 0.25 m². In particular, the area may even be at least ⅓ m². Thus, in one working example, a shielding mesh having a measurement of 600 mm×600 mm is provided.

The plate 3 has two opposite sides 5, 7. The plate 3 is preferably in plane-parallel form, such that the opposite sides 5, 7 likewise run parallel. As apparent from FIG. 2, depressions have been introduced into both sides 5, 7. The depressions introduced in the first side 5 take the form of trenches 11. Depressions 15 introduced into the opposite second side 7 lie between the trenches 11. The depressions 15 are open towards second side 7. Correspondingly, the trenches 11 are open towards the opposite first side 5. By virtue of the opening of the trenches 11 toward the first side 5, the trenches 11 may be filled with an x-ray-absorbing material 13. Since the trenches 11 extend essentially perpendicularly into the plate 3, the x-ray-absorbing material present therein can effectively absorb x-rays incident obliquely on the plate 3. By way of illustration, for this purpose, an essentially perpendicularly incident x-ray 35 is shown, which can pass through the plate 3 via a depression 15. An obliquely incident x-ray 36, as results from scatter at an object to be examined, by contrast, is absorbed in the x-ray-absorbing material 13. The depressions 15 thus serve, even in the case of a thicker plate 3, to minimize the interaction of the x-radiation with the material of the plate 3, preferably glass. The x-radiation merely has to still pass through the base wall 16 which is significantly thinner compared to the thickness of plate 3.

In general, preference is given to a plate 3 having a thickness of at least 2 millimetres, preferably at least 3 millimetres. This permits the introduction of correspondingly deep trenches 11 and hence good shielding of obliquely incident scattered radiation. But the thickness is preferably also less than 10 mm, in order that the trenches 11 are still easily fillable with x-ray-absorbing material.

Walls 19 are present between depressions 15 and the trenches 11. In the region of these walls, the thickness of the plate 3 is unchanged, but the walls 19 may be kept narrow. In addition, these walls impart mechanical stability to the arrangement.

In order to further increase mechanical stability, in one development of the invention, it is also possible to provide an edge region 27 of the plate 3 that has no depressions 15 or trenches 11. This edge region thus acts like a stabilizing border. Without restriction to the example described, the edge region may have a width of at least twice the period length of the sequence of trenches and depressions. The period of the trenches 11, or the distance between the trenches 11 measured from middle to middle of the trenches 11, in a preferred embodiment, is not more than 500 µm. One reason why this is favourable is in order to achieve high spatial resolution imaging.

The arrangement of trenches 11 and depressions 15 may especially also be matched to the pixel separations of a detector. Specifically in the case of such pixel matching, it is also possible for small changes in the shielding mesh 1, for instance as a result of mechanical deformations, to result in considerable transmission losses. For that reason too, glass is a particularly preferred material for the mesh 3. In general, borosilicate glasses are particularly suitable, both with regard to stability and with regard to structurability. Also conceivable, however, are other materials such as glass ceramics, ceramics or particular plastics. As well as borosilicate glass, soda-lime glass and aluminosilicate glass are also generally of good suitability as material for the plate. One criterion for the choice of material of the plate 3 may generally be the coefficient of linear thermal expansion thereof. This may be approximated to the coefficient of expansion of the x-ray-absorbing material in order to minimize temperature-related mechanical stresses. For example, a soda-lime glass may be of good suitability when the x-ray-absorbing material 13 has a high coefficient of thermal expansion.

Figure 3:
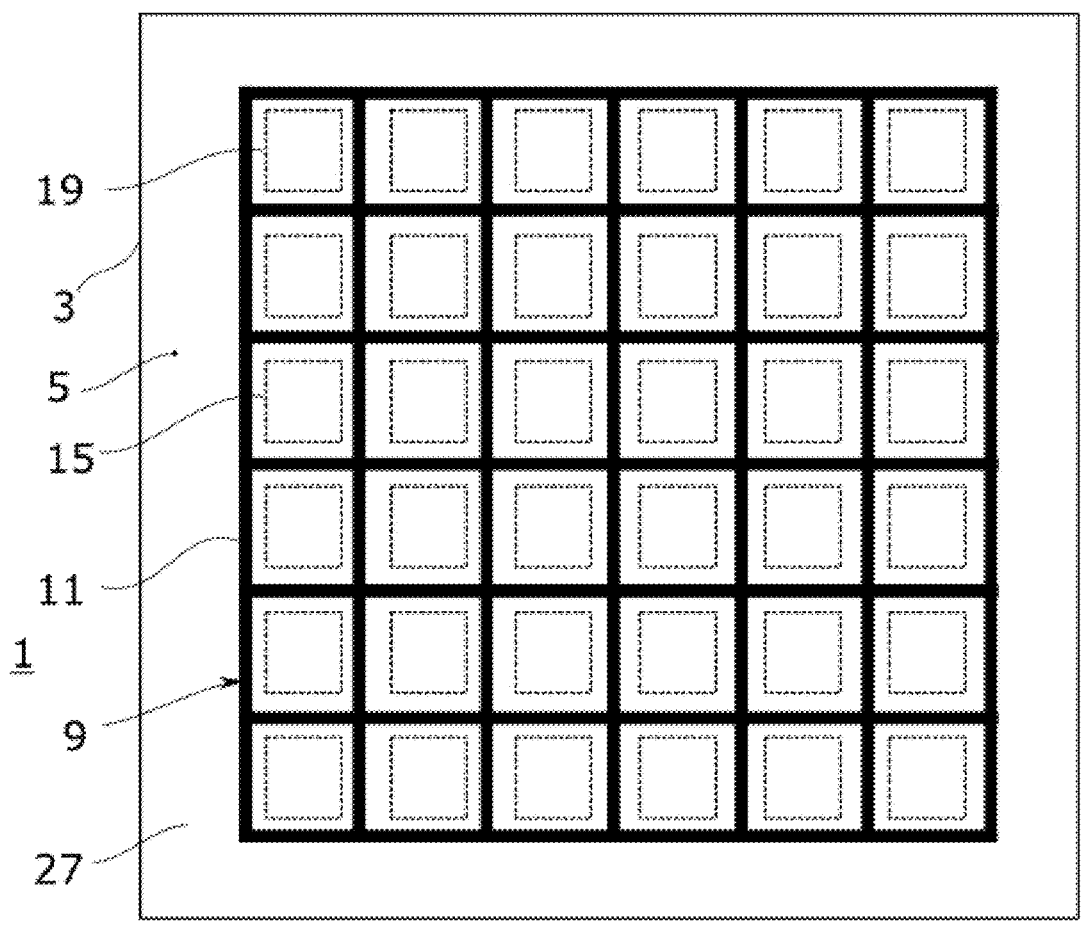
FIG. 3 shows a shielding mesh in top view.

FIG. 3 shows the shielding mesh 1 in a top view of the first side 5. In a preferred development of the invention, the mesh 9 is formed from trenches 11, or else as a crosscut mesh in the example shown. The crossing trenches 11 form cells, with the depressions 15 disposed therein. But other arrangements are also possible. For example, it is possible to achieve high transmission for direct radiation with a hexagonal mesh. Such a variant with a hexagonal mesh is shown by FIG. 4.

In general, the shape of the mesh 9 may be matched to the shape of the pixels of the detector 39. As well as the examples shown in FIG. 3 and FIG. 4, other forms are accordingly also conceivable. For instance, mesh 9 may also define rectangular, round, triangular or else, for example, octagonal channels.

Figure 4:
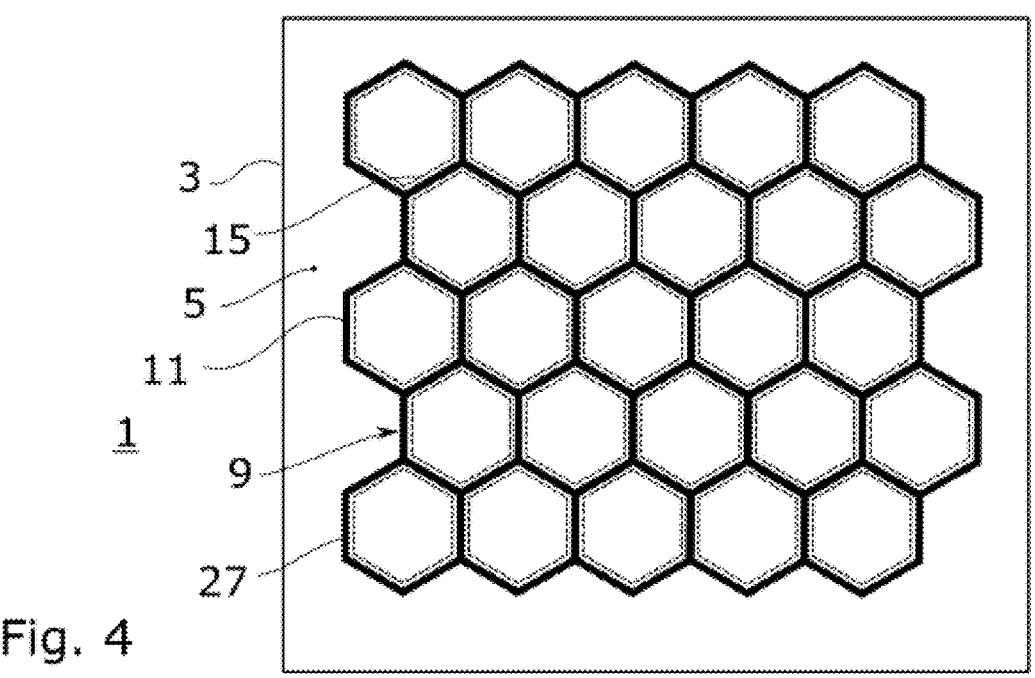
FIG. 4 shows a variant of the shielding mesh.

The diagrams in FIG. 3 and FIG. 4 should be considered to be merely schematic. In the diagram, the trenches 11 are drawn as being much narrower than the depressions 15. In practice, however, it is generally favourable to provide similar widths of trenches 11 and depressions 15, or, combined with this, a smaller distance from trench to trench relative to the width of trenches 11, in order to achieve good shielding of the scattered radiation. The diagram in FIG. 2 is closer in this regard to the preferred embodiments. In one development of the invention, it is envisaged in this regard that the width of the trenches 11 differs from the width of the depressions 15 by not more than a factor of 2.

Also particularly favourable for the transmission of the direct x-radiation and the shielding of the scattered radiation is a high ratio of depth to width of the trenches. In particular, it is possible by a method elucidated later on also to fill trenches 11 with an x-ray-absorbing material when the ratio of depth to width is 40:1 or more. If the aspect ratio is too high, however, sufficiently homogeneous or complete filling may no longer be assured. It is therefore preferable to limit the ratio of width to depth to 150:1 or less. Here too, it is evident that the drawings are merely schematic. The aspect ratio of the trenches 11 in FIG. 2 is much less than 40:1. In an alternative or preferably additional development, the width of the trenches 11 is not more than 100 µm, preferably not more than 50 µm. This is generally favourable for uniform illumination of the detector in that the low width prevents shadows. In conjunction with a high depth, or an appropriate aspect ratio, it follows that x-ray absorption will be high even when the depth of the trenches 11 is low.

A further alternative or additional factor for good shielding of scattered radiation and transmission of direct radiation is the depth of the trenches 11. The depth of the trenches 11 is preferably at least 1.5 millimetres, preferably at least 2 millimetres.

It is likewise favourable for the property of high shielding of scattered radiation when the passages or channels defined by the trenches 11 of the mesh 9 are of maximum length. The greater the length of these channels relative to their width, the more selective the mesh for the passage of direct radiation and the shielding of obliquely incident scattered radiation. Thus, in one development of the invention, the middle-to-middle distance between two adjacent trenches is less than the depth thereof. It is preferably even the case that the middle-to-middle distance is less than the depth of the trenches 11 by at least a factor of three.

Finally, for good shielding, the walls of the trenches 11 should as far as possible run at right angles to the planes of the sides 5, 7. In this regard, it is preferable when the angle of the wall 25 of a trench 11 relative to the first side 5 differs from a right angle by less than 5°. Even the lower taper angles of less than 5° can be achieved by the production method described later on, especially in a glass plate. This is applicable to the special case of trenches 11 and depressions 15 that are cut perpendicularly into the plate.

In the example shown in FIG. 2, the trenches 11 run parallel to one another in the direction perpendicular to the sides 5, 7. Such an arrangement is favourable especially when the x-rays to be detected are incident as beams of parallel rays, i.e., for instance, when the x-ray source is far removed. Typically, however, in an imaging x-ray device, for example a computed tomograph, an x-ray source in a closer arrangement is used, such that a conical beam of rays is incident on the shielding mesh. In general, therefore, in one embodiment of the invention, the trenches 11 have varying slopes, such that the walls of the trenches 11 run in directions that point toward a common virtual point source. In other words, the trenches 11 are inserted into the plate 3 in such an inclined manner that the centre axes of channels defined by adjacent trenches 11 point toward a common virtual point source. This is correspondingly also true of the centre axes of the depressions 15. Accordingly, in one embodiment of the invention, the centre axes 17 of the depressions 15 are directed to a common virtual point source. Such an arrangement is shown schematically in FIG. 5. The centre axes 17 of the depressions 15 generally also coincide with centre axes of the channels 12 defined by the adjacent trenches 11. Also present in the channels 12, in addition to the depressions 15, is the material of the plate 3 that forms the walls 16, 19. As apparent from the diagram, the trenches 11 are also directed to the virtual point source 18, such that the walls of the trenches 11 run in the direction of the point source 18. The conical beam path would also result in changes in the widths of the depressions 15 and trenches 11 within the plate 3 as in the diagram. In this case, the widths on the side facing the point source 18 (here the second side 7) would be lower than on the opposite side. But this is generally not necessary since the point source is significantly further removed in relation to the thickness of the plate 3 than in the diagram in FIG. 5. It is therefore preferable that the trenches 11 and depressions 15 have an equal width in beam direction, or in a direction perpendicular to the sides 5, 7. This progression of the widths accordingly corresponds to the diagram in FIG. 2.

What is described hereinafter is a method of producing a shielding mesh 1 according to the invention. The process for producing a shielding mesh 1 against scattered x-radiation comprises the steps of: providing a plate 3 having a first side 5 and a second side 7 opposite the first side 5, and irradiating the plate 3 with a laser beam, wherein the material of the plate 3 is transparent to the laser beam, such that the laser beam penetrates into the plate 3, wherein the laser beam leaves filamentous damage along its path through the plate 3, and wherein the filamentous damage is introduced such that a first group of filamentous damage ends on the first side and a second group of filamentous damage on the second side 7, removing the material of the plate 3 in the region of the first and second groups of filamentous damage by etching the plate 3 with an etch medium, such that the removing of the material in the region of the second group produces an arrangement of depressions 15 open toward the second side 7 of the plate 3, and the removing of the material in the region of the first group produces a mesh 9 composed of trenches 11 open toward the first side 5, and wherein, in that case, an x-ray-absorbing material 13 is introduced into the trenches 11.

Figure 6:
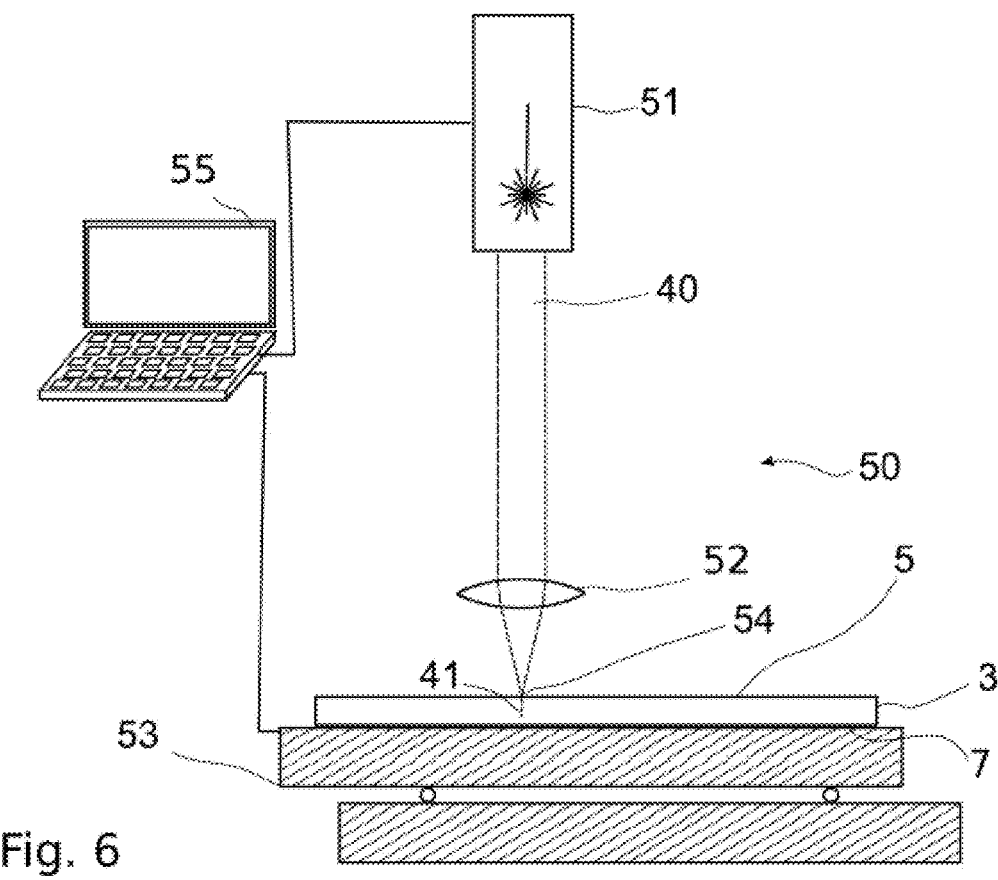
FIG. 6 shows a laser processing device for introduction of filamentous damage into the plate.

An ultrashort pulse laser is suitable for introducing filamentous damage. FIG. 6, for this purpose, shows a laser processing device for introducing filamentous damage 41 into the plate 3 in order to produce the trenches 11 and depressions 15 therefrom subsequently in an etching process. The device 50 comprises an ultrashort pulse laser 51 with upstream focusing optics 52 and a positioning device 53. The positioning device 53 can be used to laterally position the point of incidence 54 of the laser beam 40 from the ultrashort pulse laser 51 on one of the sides 5, 7 of a plate 3 to be processed. In the example shown, the positioning device 53 comprises an x-y stage on which the plate 3 lies on one of its sides 5, 7. But an alternative or additional option is also for the optical unit to be designed so as to be mobile, in order to move the laser beam 40, such that the point of incidence 54 of the laser beam 40 is movable over the plate 3. The focusing optics 52 then focus the laser beam 40 to a focus elongated in beam direction, i.e. accordingly transverse to the irradiated side of the plate 3. Such a focus can be generated, for example, with a conical lens (called an axicon) or a lens having high spherical aberration. The control of the positioning device 53 and of the ultrashort pulse laser 51 is preferably conducted by means of a programmed computing device 55. In the diagram of FIG. 6, the laser beam 40 hits the plate 3 perpendicularly. The positioning device 53 and/or the focusing optics 52 may, however, in a preferred embodiment, also be designed so as to enable oblique incidence, in order to produce filamentous damage 41, which lies in each case in longitudinal direction parallel to the envisaged centre axes 17, or generally parallel to the direction of the virtual point source 18. In general, without restriction to the specific working examples described, therefore, in a development of the invention, it is envisaged that the filamentous damage 41 is introduced at least partly obliquely to one of the sides 5, 7 of the plate 3. By using the positioning device 53 to successively introduce points of incidence, or positions of filamentous damage 41, distributed over the plate 3 in a predetermined pattern, it is possible to create predetermined patterns that are then elaborated in a subsequent etching step.

In one working example, the following parameters may be used for the laser beam: the wavelength of the laser beam is 1064 nm, typical of a YAG laser. A laser beam having a raw beam diameter of 12 mm is generated, which is then focused with optics in the form of a biconvex lens having a focal length of 16 mm. The pulse duration of the ultrashort pulse laser is less than 20 ps, in one working example about 10 ps. The pulses are released in bursts with 2 or more, preferably 4 or more, pulses. The burst frequency is 12-48 ns, in one example about 20 ns, the pulse energy is at least 200 microjoules, and the burst energy is correspondingly at least 400 microjoules. The ultrashort pulse laser, in one embodiment, may be operated with a repetition rate for the bursts, or pulse packets, of between 1 kHz and 1000 kHz, preferably between 2 kHz and 100 kHz, more preferably between 3 kHz and 200 kHz. This repetition rate and/or scan rate may be chosen so as to achieve a desired distance between adjacent damage sites/channels. Other variants of the Nd:YAG laser, such as the wavelengths of 532 nm or 355 nm generated by frequency doubling (SHG) or frequency tripling (THG), or else a Yb:YAG laser operated at an emission wavelength of 1030 nm, may be used as radiation sources in a suitable manner.

A particular adaptation of the method for the production of blind holes/channels can be effected via the processing of the laser beam. Specifically, it is possible to use an extremely short focal length, especially a focal length of f<20 mm. In an alternative or additional embodiment, a highly expanded raw beam is used. More preferably, for this purpose, the laser beam has a beam radius of at least 4 mm on incidence on the object lens, or on the focusing optics.

A further measure is a modification of the intensity distribution. For this purpose, the maximum intensity may be moved from the optical axis to the edge regions of the focusing optics, or generally distributed over a wider area. Beam profiles with such a feature include a flat-top profile and a donut profile.

Since alignment of the depressions and trenches to a point source also entails oblique irradiation, it is also advantageous to undertake inward coupling, especially close to the Brewster angle, with an orientation of polarization parallel to the substrate surface. In addition, it is optionally possible to undertake asymmetric illumination of the focusing optics in order to achieve greater angles of incidence.

Embodiments for the method of introducing filamentous damage and the laser parameters suitable for the purpose, and also parameters the subsequent etching, can also be found in DE 10 2017 101 673.2, DE 10 2018 110 211.9 and PCT/EP2021/077030. These applications also form part of this disclosure in their entirety with regard to the embodiments for the introduction of filamentous damage 41 and the parameters for laser irradiation and etching.

Figure 7:
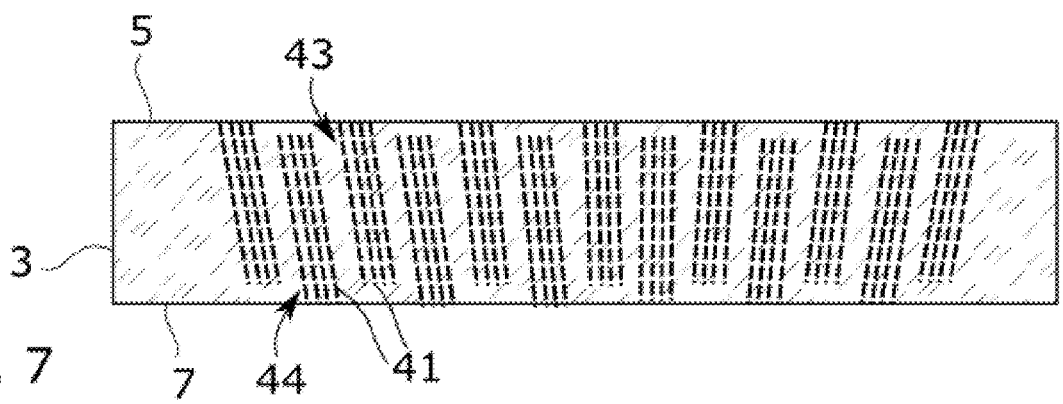
FIG. 7 shows a cross section of a plate with introduced filamentous damage.

FIG. 7 shows a plate 3 with introduced filamentous damage. The filamentous damage 41 is divided into two groups 43, 44. The filamentous damage 41 in the first group 43 ends at the first side 5, and the filamentous damage 41 in the second group 44 at the second side 7. It is generally particularly preferable, without restriction to the example shown, when at least some, preferably all, of the filamentous damage 41, or the filamentous damage in both groups 43, 44, ends within the plate 3 as shown. In this way, in the subsequent etching operation, depressions 15 in the form of blind holes, or trenches 11 that end in the plate, are produced even when the plate is exposed to the etching medium on all sides. The filaments preferably penetrate 50% to 90% of the thickness of the glass, such that, after the etching operation, the channels or blind holes/hollows that form the depressions 15 and trenches 11 preferably reach 55% to 95% of the glass thickness.

The filamentous damage 41 thus ends on the one hand within the plate, or on the other hand at one of the sides 5, 7. As likewise apparent from FIG. 6, the filamentous damage 41 is also introduced obliquely relative to the virtual point source depending on the angle of the direction envisaged later. In one embodiment of the method, it is unnecessary to turn the plate 3 for the insertion of the filamentous damage 41. Instead, it is sufficient to adjust, or to alter, the position of the elongated focus of the laser beam 40. For this purpose, the position of the lens and/or the position of the plate 3 may be altered. If, for example, in the plate 3 according to FIG. 7, the laser beam 40 is incident on the first side 5, the start of the elongated focus for the filaments of group 43 may be on or even before the plate 3. In order to introduce filaments of group 44, the focus may then be moved in beam direction to such an extent that the start of the elongated focus of the laser beam 40 is within the plate 3. Without restriction to particular working examples, it is therefore envisaged in one embodiment of the method that at least some of the filamentous damage 41 in both groups 43, 44 is generated with incidence of the laser beam 40 on the same side 5, 7 of the plate 3 and a change in the focal point of the laser beam 40 relative to the plate and in the direction of the laser beam 40.

If the material used for the plate 3 is a glass and etch medium used is an alkali, it is possible in the case of gradual etching to achieve a characteristic surface topography on the walls of the trenches 11 and depressions 15. Specifically, the surface of the trenches 11 and depressions may have a multitude of mutually adjoining small dome-shaped depressions. The dome-shaped depressions preferably have a depth of less than 10 μm, preferably less than 5 μm, preferably less than 2 μm, where the depth is defined by a difference between a centre of a depression dip and an average height of the edge surrounding the depression. The dome-shaped depressions are also described in more detail in DE 10 2017 101 673.2, DE 10 2018 110 211.9 and PCT/EP2021/077030, the contents of which in this regard are fully incorporated into this disclosure. The surface topography with the dome-shaped depressions ensures good bonding of the plate 3 to the x-ray-absorbing material. In particular, it is possible to achieve a firm bond when the x-ray-absorbing material comprises a molten glass, such as, in particular, a glass solder. The depressions increase the surface area for cohesive bonding, and proper interdigitation of the two materials is achieved.

Figure 5:
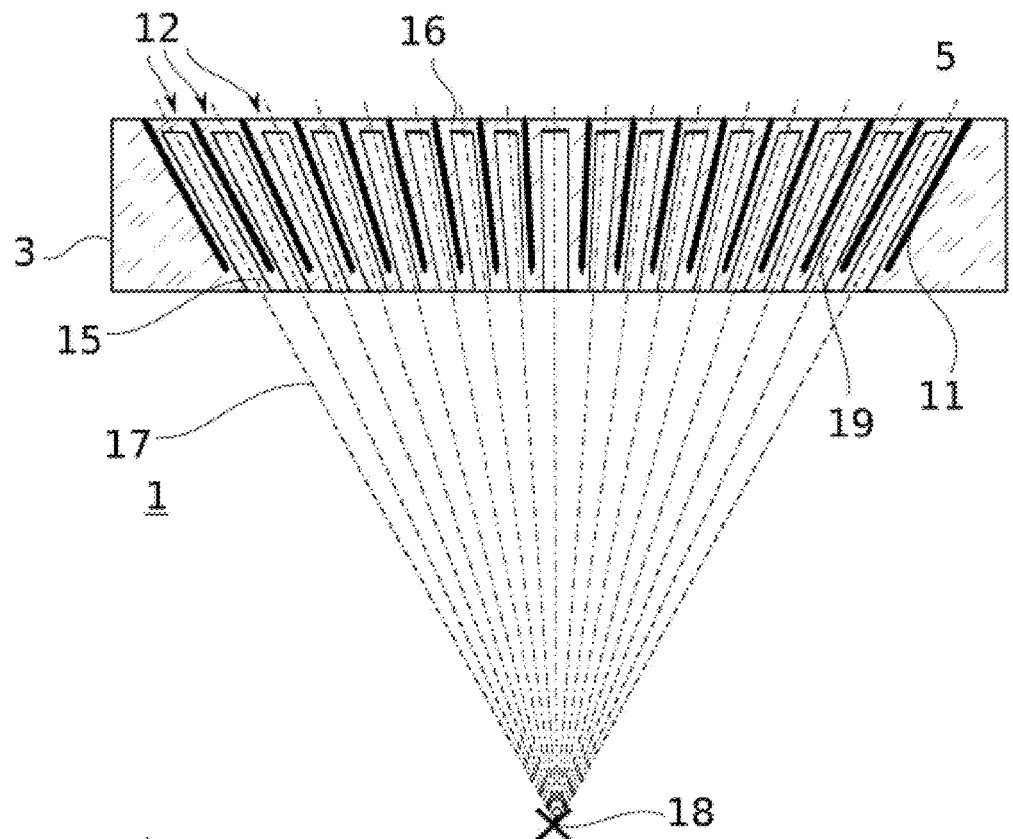
FIG. 5 shows a cross section of a variant of the shielding mesh with depressions directed to a point source.
Figure 8:
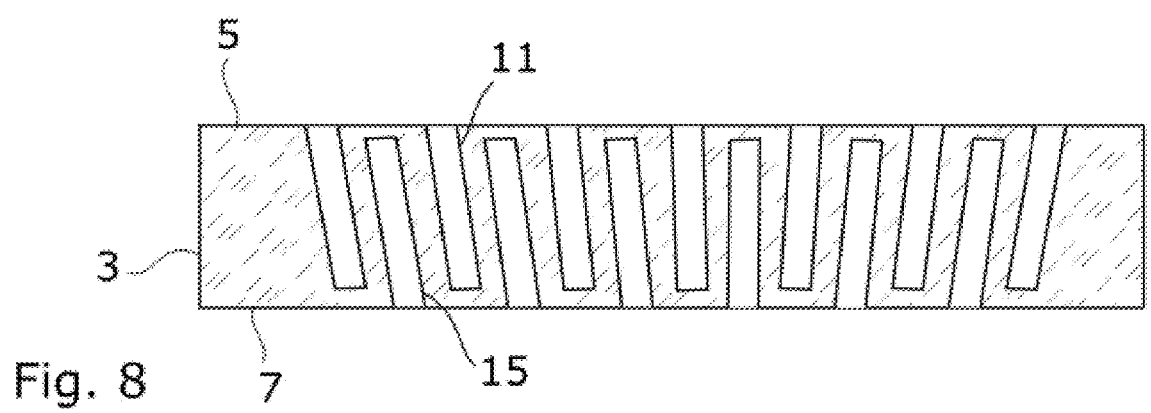
FIG. 8 shows the plate after etching.

FIG. 8 shows the plate 3 after etching. The material of the plate 3 is etchable significantly more quickly along the filamentous damage 41 than in regions without such damage. Therefore, the material, preferably glass, is removed in the etching operation with extension of the filamentous damage 41. The channels that form are ultimately combined and form the desired structures in the form of trenches 11 that proceed from the first side 5, and depressions 15 that extend from the second side 7 into the plate 3. In accordance with the inclination of the filamentous damage 41, the trenches 11 and depressions 15 are also aligned toward a virtual point source, as shown in FIG. 5.

Figure 9:
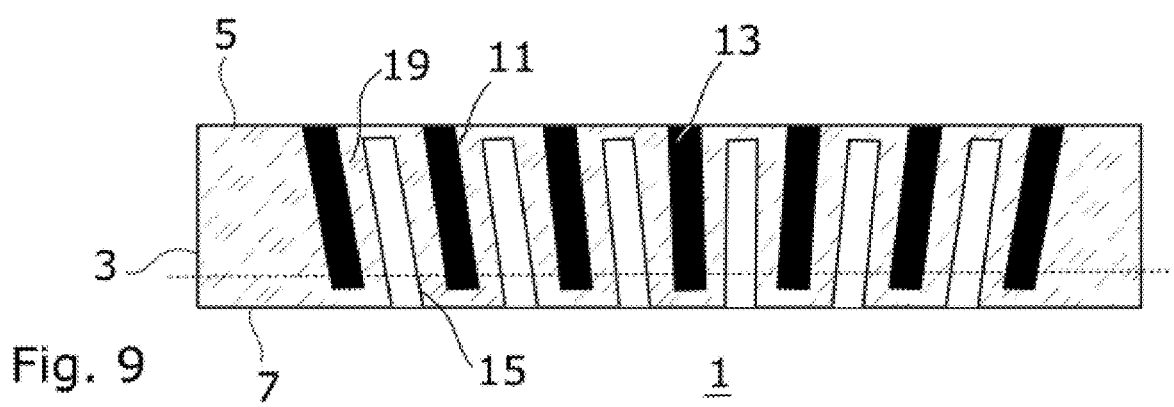
FIG. 9 shows the plate after the trenches have been filled with an x-ray-absorbing material.
Figure 10:
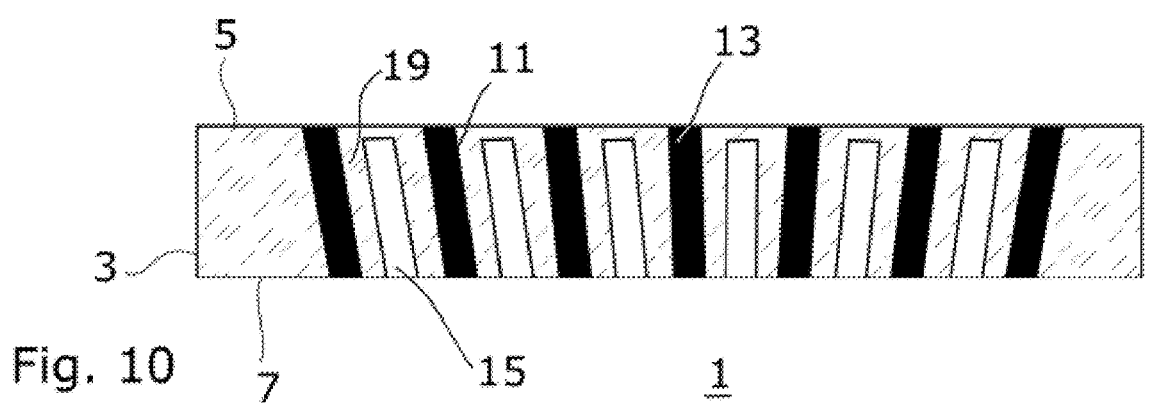
FIG. 10 shows a variant of the embodiment according to FIG. 9 with a thinned plate.

Finally, on the side 5, the x-ray-absorbing material 13, for example in the form of a paste, may be introduced into the trenches 11, so as to obtain the shielding mesh 1 shown in FIG. 9. In one development of the method, it is generally the case, without restriction to the specific embodiment described, that the plate 3 can also be thinned after filling with the x-ray-absorbing material 13, for example in order to reduce x-ray absorption. In FIG. 9, a dotted line running parallel and close to the second side 7 has been drawn in. If the plate 3 is ground down to that line on the side 7, what is obtained is a plate 3 as shown by FIG. 10. In another alternative or additional development, which is also implemented in the embodiment of FIG. 10, the thinning of the plate exposes the trenches 11 and hence the x-ray-absorbing material 13 on the second side 7. What this therefore gives is thus generally an embodiment in which the trenches 11 are at least partly open on both sides 5, 7 of the plate 3. This embodiment is not restricted to thinning; for example, it is also possible to introduce the filamentous damage 41 at least partly right through the plate 3, such that the filamentous damage 41 ends on both sides 5, 7. Yet another option is to introduce closely aligned filamentous damage 41 that ends alternately on one or the other side 5, 7. The etching operation then connects the channels formed along the filamentous damage 41, and a trench 11 is created with a continuous connection between the two sides 5, 7. Here, however, there may under some circumstances no longer be any direct connection between the sections of the plate 3 that adjoin a trench 11. In order to maintain mechanical stability, however, it is possible, for example, to leave lands that are obtained by means of regions of the trenches 11 with reduced depth. An alternative or additional option is to provide an x-ray-absorbing material that forms a cohesive bond to the wall of the trench 11. In general, not just for the variant of FIG. 10, it is preferable to provide a glass, especially a glass solder, as constituent of the x-ray-absorbing material 13, in which case the glass is melted and hence forms a cohesive bond to the material of the plate 3, preferably likewise a glass. It may be the case that partial melting of the glass is sufficient. A suitable constituent of the x-ray-absorbing material 13 is especially a lead- and/or bismuth-containing glass, for example a lead glass, irrespective of whether or not it is in molten form. Lead- and/or bismuth-containing glass, on account of its lead or bismuth content, has a good shielding effect with respect to ionizing radiation, especially with respect to x-radiation. The gas may also wholly or partly crystallize. For instance, specifically crystallizing glasses or glass solders are known. In that case too, in the context of this disclosure, however, reference is made to a fully molten or partly molten glass as a constituent of the x-ray-absorbing material. In general, it is accordingly envisaged, in one embodiment, that the x-ray-absorbing material 13 comprises a partly molten or fully molten glass.

In addition, it is advantageous for cohesive bonding of x-ray-absorbing material 13 and plate 3 and/or permanent, stable fixing of the x-ray-absorbing material 13 in the trenches 11 when the x-ray-absorbing material 13 comprises a molten glass solder. It is very advantageous here that there are lead-containing glass solders. Specifically lead oxide as glass component is suitable for achieving a low softening point, and simultaneously provides a high shielding effect. In order that the glass can be melted in the trenches 11 without deforming the plate 3, it is generally preferable when at least one of the following features is applicable to the glass of the x-ray-absorbing material 13 and the glass of the plate 3: the glass of the x-ray-absorbing material 13 has a glass transition temperature $T_g$ at least 100° C., preferably at least 160° C. or even at least 220° C. lower than the glass transition temperature $T_g$ of the glass of the plate 3, the glass of the x-ray-absorbing material 13 has a processing temperature at which the viscosity thereof is 104 dPa·s which is lower by at least 100° C., especially at least 200° C., more preferably at least 250° C., than the processing temperature of the glass of the plate 3, the glass of the x-ray-absorbing material 13 has a processing temperature at which the viscosity thereof is 104 dPa·s which is lower than the temperature of the softening point of the glass of plate 3, where the softening point is defined by a viscosity of 1076 dPa·s.

In one example, for the x-ray-absorbing material 13, a glass solder of the G017-52 type from Schott AG is used. In the case of a plate 3 made from Borofloat 33 glass from Schott AG, there is a difference in glass transition temperatures $T_g$ of 263° C. The viscosity of the glass solder G017-052 is 1076 dPa·s at 347° C. This temperature is 218° C. lower than the softening point of Borofloat 33 glass.

A glass as a constituent of the x-ray-absorbing material, irrespective of whether the glass contains lead or not, has yet a further advantage in conjunction with the arrangement described here. Glass, being a brittle material, can be ground very finely. The glass dust is then also highly suitable for introduction into the narrow, deep trenches 11, for example as a constituent of a pasty formulation. The introduction can then be effected in a simple manner, for example by squeegeeing. In one working example, the pasty formulation is introduced into the trenches 11, then dried, preferably at 100° C. to 200° C. Introduction and drying can especially be repeated in the case of a large aspect ratio of the trenches 11, in order to completely fill the trenches 11. If the trenches 11 are sufficiently filled, heat treatment can be effected at 350° C. to 450° C., in which the glass of the formulation is melted, in order to obtain an x-ray-absorbing material 13 firmly bonded to the walls of the trenches 11. In one embodiment, it is therefore envisaged that a pulverulent glass, preferably a glass solder 21, is introduced into the trenches 11 as a constituent of the x-ray-absorbing material 13, preferably a mixture of a pulverulent glass with particles, and wherein the glass solder 21 is fully melted or partly melted, so as to produce a solid x-ray-absorbing material 13 that sticks to the walls of the trenches 11.

Figure 11:
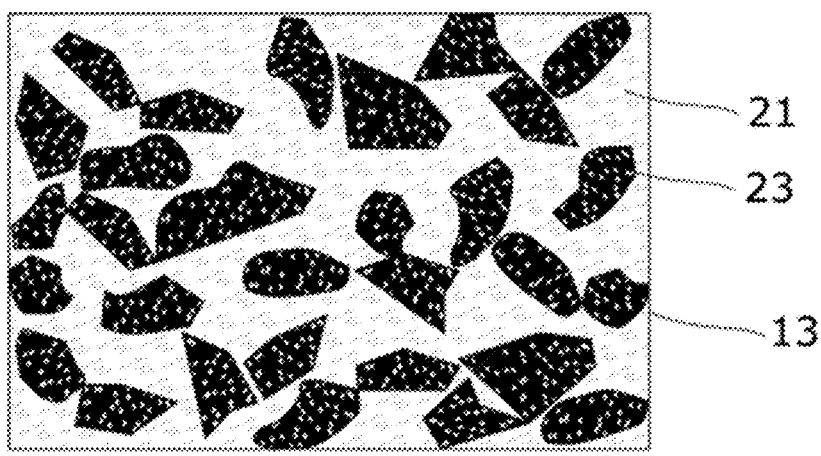
FIG. 11 shows a schematic of a cross section through an x-ray-absorbing material.

FIG. 11 shows a schematic of a preferred embodiment of the x-ray-absorbing material. The x-ray-absorbing material 13 in this embodiment generally contains particles, preferably metal particles 23. In a particularly preferred development, the x-ray-absorbing material 13 comprises particles embedded in a molten material, especially metal particles 23 and/or mineral particles and/or ceramic particles. A component in particle form or as particles, in the context of this disclosure, as well as metallic grains or particles, is also understood to mean ceramic or glass-ceramic or semicrystalline glasses, and also crystallites (mono- or polycrystalline) as grains or particles, or a combination thereof. The molten material may preferably, as in the example described, be a molten glass or glass solder 21. The glass ensures a firm and generally also mechanically durable bond of the x-ray-absorbing material 13 to the plate 3. Without restriction to specific embodiments, therefore, in one development of the production method, it is envisaged that a paste is provided, containing glass particles and particles, preferably metal particles 23, wherein the paste is preferably introduced into the trenches 11 by squeegeeing, and wherein the plate 3 together with the glass particles and particles in the trenches 11 is heated up, such that the glass particles soften and an x-ray-absorbing material 13 with glass-embedded particles, preferably metal particles 23, is obtained.

Without restriction to specific working examples, in a preferred embodiment, the paste, in addition to the respective solids, preferably at least glass dust and metal dust, or metal particles 23, contains organic solvents or suspension media. In general, the paste, in a preferred configuration, is thus a mixture of the ground glass with metal dust and one or more organic solvents. Further admixtures are optionally present, for example crystalline inorganic materials. Preferred organic solvents or suspension media are liquid organic substances of low viscosity and high melting point. The melting point is preferably at least 120° C., more preferably at least 180° C. Viscosity at 20° C. is preferably less than 5 mPa·s. Various glycol ethers are particularly suitable.

For the metal particles 23, it is advisable to use a particularly heavy metal or alloy comprising at least one heavy metal. In general, it is preferable that the metal particles 23 contain metals having an atomic number greater than 55 in a proportion of at least 66 at %. In an alternative or additional embodiment, the metal particles 23 have a density of at least 9 g/cm$^3$ in order to achieve good x-ray absorption. In particular, the density of the x-ray-absorbing material 13 is preferably significantly higher than the density of plate 3. This achieves very different x-ray absorption in the different materials and a correspondingly high contrast. It is therefore preferable when the density of the x-ray-absorbing material 13 is greater at least by a factor of four than the density of the material of plate 3.

More preferably, the x-ray-absorbing material 13 comprises particles of a tungsten-containing material, preferably in the form of metallic tungsten or a tungsten alloy. Tungsten has a particularly high density. In purely metallic form, tungsten has a density of 19.25 g/cm$^3$. Alternatively or additionally, it is also possible for particles of a tungsten-containing mineral and/or a tungsten-containing ceramic to be present. With heavy metals, for instance tungsten, it is also possible to achieve a high density of the x-ray-absorbing material 13. Thus, in a preferred embodiment, the x-ray-absorbing material 13 has a density of at least 9 g/cm$^3$, preferably at least 11 g/cm$^3$. Such high densities can be achieved particularly with a combination of metal particles of heavy metals and glass, especially lead glass or a glass solder. These densities are not self-evident even for x-ray-absorbing materials. For instance, plastics or polymer pastes endowed with tungsten typically attain densities of only somewhat above 8 g/cm$^3$.

By virtue of the ingredients of the x-ray-absorbing material 13, it is additionally also possible to adjust the coefficient of thermal expansion thereof. Through choice of the ingredients and a suitable material for plate 3, especially a suitable glass, in one development of the shielding mesh 1, it is possible to limit the magnitude of the difference of the coefficients of linear thermal expansion of x-ray-absorbing material 13 and the material of plate 3 to less than 3 ppm/K. In order to match the coefficients of expansion to one another or to at least reduce the difference in the coefficients of expansion of plate and x-ray-absorbing material, in one embodiment, at least one component, preferably in particle form, or as particulate admixture for formulation thereof should be provided in the x-ray-absorbing material, said component having, in at least part of the temperature range between 0° C. and 200° C., a coefficient of linear thermal expansion which is less than 1 ppm/K or even negative. The particles may, for example, at least partly take the form of crystallites. It is particularly advantageous here that there are also materials having high density that meet these conditions and therefore also still have a good shielding effect. Specifically known are lead or tungsten compounds that have such coefficients of thermal expansion. In a development of this embodiment, the x-ray-absorbing material 13 contains at least one of the compounds lead titanate and/or zirconium tungstate.

In yet a further embodiment, the coefficients of linear thermal expansion of the glass of the x-ray-absorbing material 13 and of the metal particles 23 are also matched to one another. Preferably, the glass and the metal particles 23 are selected such that the magnitude of the difference in the coefficient of linear thermal expansion is not more than 5 ppm/K. Described hereinafter is a working example of the x-ray-absorbing material 13, or of the ingredients of a paste for production of the x-ray-absorbing material 13. The glass used is a lead oxide-containing glass solder of the G017-52 type. The glass has a high lead content, with a PbO content of 86 percent by weight. Further components added are tungsten metal particles. The properties and composition of the x-ray-absorbing material produced therefrom are given in the following table:

TABLE

| Coefficient of linear thermal expansion of tungsten | $4.5 \cdot 10^{-6}$ K$^{-1}$ |
| --- | --- |
| Density of tungsten | 19.25 g/cm$^3$ |
| Coefficient of linear thermal expansion of glass | $11.4 \cdot 10^{-6}$ K$^{-1}$ |
| Density of glass | 6.65 g/cm$^3$ |
| Material combination: | |
| Proportion by volume of tungsten | 60.85% |
| Proportion by mass of tungsten | 81.82% |
| Proportion by volume of glass | 39.15% |
| Proportion by mass of glass | 18.18% |
| Coefficient of expansion of the combination | $7.2 \cdot 10^{-6}$ K$^{-1}$ |
| Density of the combination: | 14.34 g/cm$^3$ |

As apparent from this working example, the combination of materials can achieve a very high density of well above 9 g/cm$^3$, even well above 11 g/cm$^3$.

A further glass that can be used for the x-ray-absorbing material is the bismuth glass solder G018-423 from Schott AG. This glass solder contains up to 84 percent by weight of $Bi_2O_3$.

It is a challenge in the above-described filling of the trenches 11 by squeegeeing that the trenches 11 are very narrow and deep on account of the high aspect ratio. The trenches 11 should nevertheless be very substantially complete. There should also be no formation of pores, or formation of a minimum number of small pores, after the melting of the glass. These properties can be influenced in a surprisingly effective manner by the grain sizes of the materials.

Figure 12:
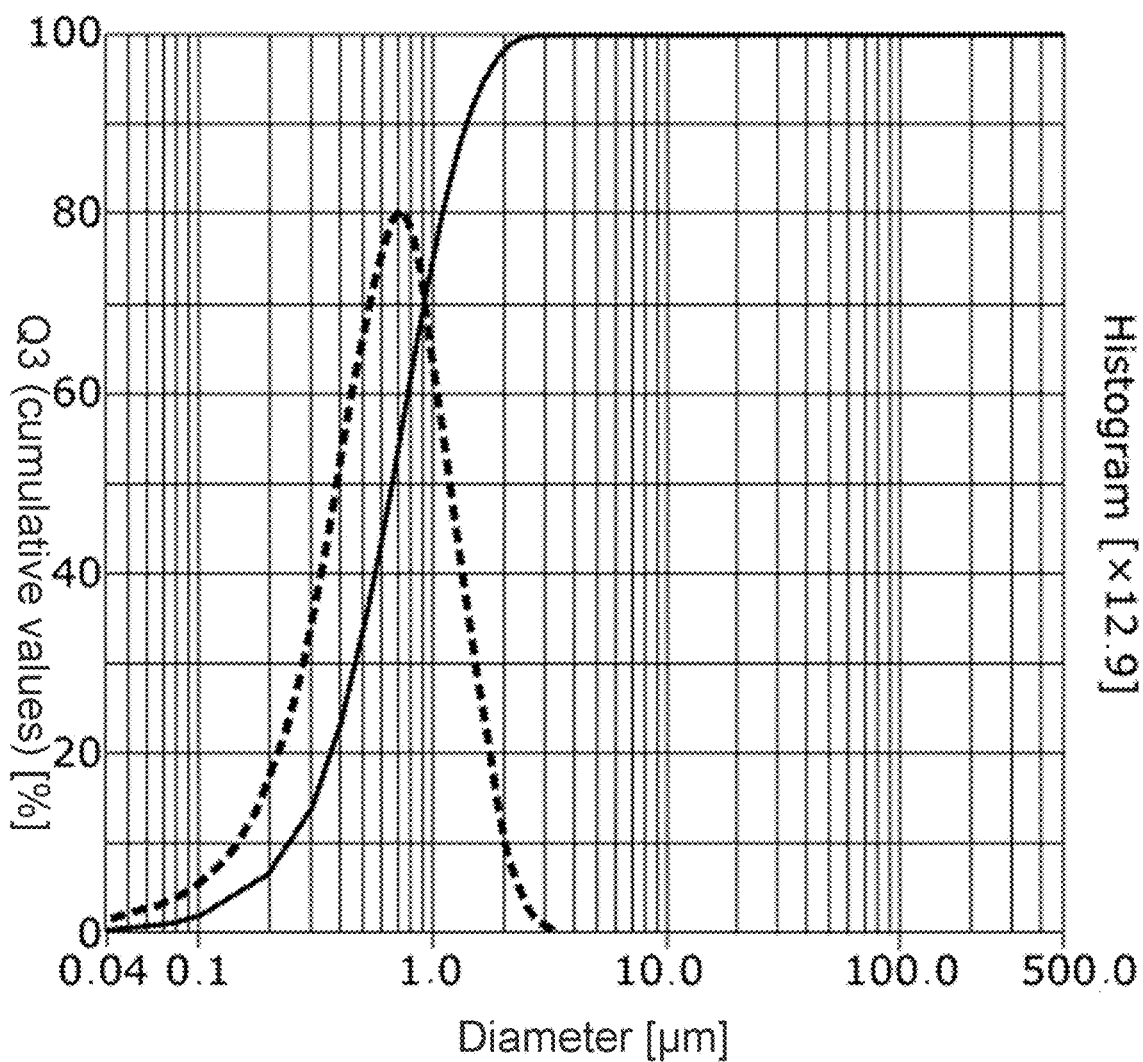
FIG. 12 shows a particle size distribution of a ground glass solder.

FIG. 12 shows a particle size distribution for a glass solder ground with an attritor. One suitable glass type is the applicant's G017-052 solder glass. The dotted curve is the histogram of the glass particle diameters. The solid line indicates the cumulative progression of particle sizes. The glass particles are not spherical; the diameter shown on the abscissa of the diagram therefore relates to the average lateral dimensions. The glass powder has a 90% diameter of 1.39 µm. This is the diameter which is the maximum for 90% of the glass particles. The 50% diameter is 0.67 µm, and the 10% diameter 0.24 µm. In one development of the method, the components used, i.e. the glass powder and the metal particles in particular, should be selected so as to maximize the filling level. Typically, this is undertaken under the secondary condition that the content of metal particles is at a maximum. Under this secondary condition too and with possibly defined particle size distributions, it is possible to adjust the filling level by adding two metal powders having different particle size distributions to the paste, or more generally to the mixture of glass particles and metal particles. By different weightings of the two powders and taking account of the particle size distribution of the glass powder, it is then possible to optimize the filling level. In a preferred embodiment, the filling level of the introduced material 13 that has optionally been consolidated, preferably as described above by melting or partial melting of a glass, in the trenches 11 is at least 40% by volume, preferably at least 60% by volume. The achievable target filling level is actually a fill level of at least 70% by volume.

The filling level can be calculated, for example, by an Andreasen model. In an Andreasen model, a particle size distribution which takes the following form is assumed:

$$F(d) = 100 * \left(\frac{d}{d_{max}}\right)^n$$

The function values F(d) that are dependent on particle diameter are the cumulative percentages of the particles with a diameter of not more than d. The function values F(d) therefore correspond to the cumulative values Q3, or to the solid line in the diagram in FIG. 12. The shape of the distribution is determined especially by the constant n. The parameter $d_{max}$ indicates the maximum diameter of the particles present.

Optimization can also be conducted by other models known to the person skilled in the art. Alternative models are, for example, the $\Psi$ model, or the Dinger-Funk model.

Figure 13:
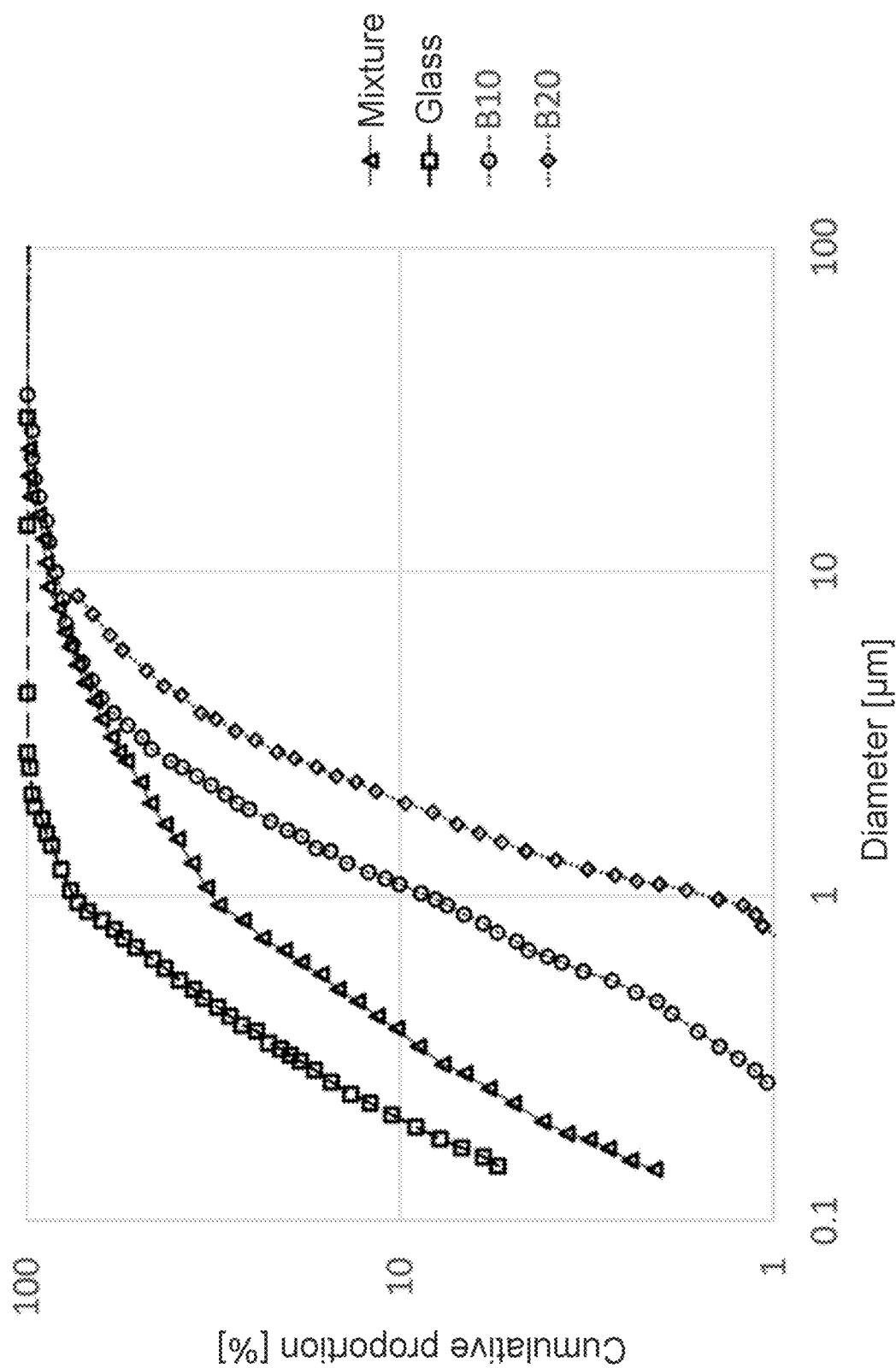
FIG. 13 shows particle size distributions for ground glass, two metal dusts and a mixture thereof.

FIG. 13 shows particle size distributions according to a working example. Specifically, in addition to the particle size distribution of the ground glass from FIG. 12, another two particle size distributions for tungsten metal powder B10 and B20 are shown, as is the mixture of all three components, i.e. of the ground glass with the two metal powders. The particle size distributions can be characterized by their d50 value inter alia. This is the value at which the number of large and small particles is the same. In other words, half of all the particles of the respective dust or ground material have a diameter less than the d50. The d50 of metal powder B10 is 3 µm, the d50 of metal powder B20 is 5 µm, and the d50 of the ground glass is only 0.67 µm. Metal powders B10 and B20 are supplied by A.L.M.T. Corp. (JP).

As apparent from FIG. 13, the glass has the smallest particle sizes and the metal powder B20 the largest particle sizes. In one embodiment, the at least three components, namely the ground glass and the two metal powders here, are thus mixed so as to obtain a maximum packing density. The process thus includes, in one development, generally the steps of measuring or calculating a packing density of a mixture of a ground glass (or glass dust) with at least one further powder, calculating and/or else measuring the packing density of the mixture, at least once calculating or measuring the packing density of a mixture with a varied mixing ratio, using the at least two results from the calculation or measurement to select or determine a mixing ratio for a formulation for filling of the trenches 11, and producing a formulation with the mixing ratio. The selected mixing ratio for the formulation may, but need not, correspond to one of the analysed or calculated mixing ratios. For instance, an ideal mixing ratio may also be interpolated or extrapolated from the results.

The particle size distribution of a mixture of the glass powder and the two metal powders B10, B20 that has been optimized with regard to packing density, in terms of its particle sizes, is between the metal powders on the one hand and the glass dust on the other hand. In one working example, the formulation has the following mixture:

| Component | Per cent by weight | Per cent by volume | d50 |
| --- | --- | --- | --- |
| B10 tungsten | 21.82 | 16.19 | 3 µm |
| B20 tungsten | 60 | 44.65 | 5 µm |
| G017-052 glass | 18.18 | 39.16 | 0.67 µm |

The tungsten metal particles thus have a proportion by weight of somewhat above 80 percent by weight and a proportion by volume of about 30 percent by volume.

Alternatively or additionally to metal particles, it is also possible to use minerals or ceramics that contain heavy elements, especially heavy metals. A heavy element, in accordance with the definition given above, is understood to mean an element of atomic number 55 or higher. Here too, it is preferably the case that the x-ray-absorbing material is a material including at least 10 percent by weight of elements having an atomic number of at least Z=56, preferably at least 25 percent by weight, more preferably in a proportion of at least 50 percent by weight of those elements with Z≥56, even if no metal particles are additionally present. Suitable minerals include scheelite, or calcium tungstate ($CaWO_4$), lead oxide and lead sulfide.

If, as is preferred, the mixture introduced into the trenches 11 is heated such that the glass melts or softens and hence forms a solid matrix for the metal particles 23, the glass particles are generally no longer apparent in the finished shielding mesh. Another characteristic of a preferred mixture having high packing density and hence also for an x-ray-absorbing material 13 with high absorptive action is that the metal particles 23 have a broad size distribution on account of the mixture of two different fine metal dusts. In general, without restriction to the above-elucidated example, therefore, an x-ray-absorbing material 13 is provided, in which the particles that are preferably fixed in glass take the form of a mixture of at least two powders, especially metal powders, and or mineral powders and/or ceramic powders with different d50 values. In particular, these d50 values may also, as in the working example, differ by at least 1.5 µm. Another accompanying feature of this mixture is that the particle size distribution is comparatively broad, and at least much broader than the particle size distributions of the two metal dusts on their own. If an Andreasen distribution according to the above equation is matched to such a real distribution, the result is a comparatively small exponent n. In a further embodiment, therefore, an x-ray-absorbing material 13 is provided, containing particles, preferably metal particles 23, having a particle size distribution for which the exponent (or modulus) n of an Andreasen distribution of particle diameter d matched to the particle size distribution of the metal particles 23, $$F(d) = 100 * \left(\frac{d}{d_{max}}\right)^n,$$

is less than n=0.33, preferably less than n=0.28, where $d_{max}$ is the maximum particle diameter of the matched Andreasen distribution. Since the Andreasen distribution is idealized and matched to the actual distribution of the metal particles 23, the $d_{max}$ value need not necessarily correspond to an actual maximum particle diameter of the metal particles 23. In the log-log plot of FIG. 13, Andreasen distributions are not curves, like the particle size distributions actually shown, but straight lines.

The use of two metal powders of different fineness can cause the particle size distribution not just to be broader. In an alternative or additional embodiment, the particle size distribution of the particles, especially metal particles 23, in the x-ray-absorbing material 13 may also be bi- or multimodal. In the diagram of particle size distribution as shown for the ground glass in FIG. 12, this means that the histogram has two or more different maxima.

Figure 14:
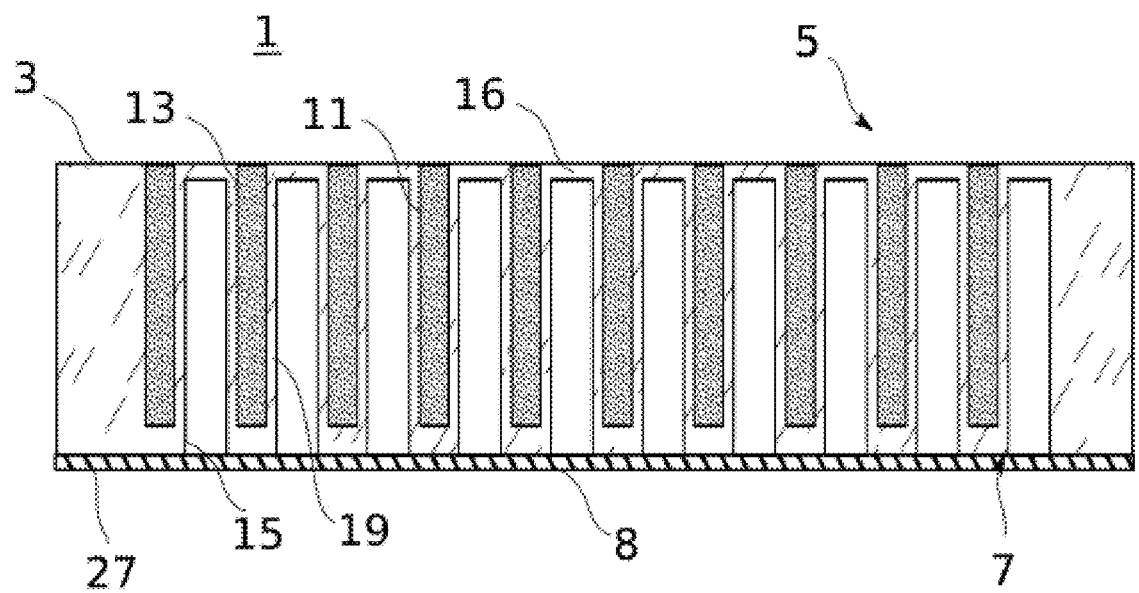
FIG. 14 is a development of the embodiment shown in FIG. 2.

As well as the tungsten dusts, it is also possible for further components to be present in particle form. What is being contemplated here is, for example, the use of admixtures with which the coefficient of thermal expansion of the x-ray-absorbing material can be adjusted, for example low-expansion materials or even components with negative thermal expansion, such as lead titanate or zirconium tungstate. The introduction of the trenches 11 and depressions allows large parts of the material of the plate 3 to be removed. In particular, the connections running through the material in the plate 3, as apparent from the embodiments in FIGS. 2, 8 and 9, may not be linear by virtue of this structuring, but run in a meandering manner. This lowers the stability of the plate 3. Material cohesion with a solid x-ray-absorbing material 13, as for instance in the form of a molten glass, or glass solder 2, can increase the strength again. Nevertheless, it may be desirable to impart more strength to the structured plate 3. One means of doing so is the connection of the plate 3 to a further plate. It is preferable here to connect the plate 3 to a glass plate. In particular, it is possible to use a thin glass plate for this purpose. In this regard, FIG. 14 shows one example of this embodiment. In one variant, as shown, the thin glass plate 8 is secured on the second side 7 of the plate 3. One advantage of this arrangement is that the depressions 15 are additionally closed, such that contamination or soiling of the depressions 15 is avoided. A thin glass plate 8 in the context of this disclosure is understood to mean a glass plate having a thickness of not more than 250 µm, preferably not more than 150 µm. A thin glass is particularly suitable in this case since x-ray absorption is only low on account of the low material thickness. It is particularly advantageous at the same time that even the thin glass considerably increases the mechanical stability of the arrangement. This is because the depressions 15 typically have only a low width, or lateral width. As a result, the thin glass can barely bend above the depressions 15, and so a great increase in stiffness is achieved. The same is correspondingly also applicable to a thin glass plate 8 secured on the first side 5 of the plate 3. In general, without restriction to the example described, therefore, in one embodiment, a thin glass plate 8 is secured on at least one side 5, 7 of the plate 3. Multiple methods are suitable for securing. A simple variant is adhesive bonding, for example with an epoxy resin or a silicone. Also conceivable is the use of a glass solder, for example the same glass solder which is also used for the x-ray-absorbing material 13. Bonding to a glass solder makes it possible to perform securing of the thin glass plate 8 to the plate 3 and the melting of the glass solder of the x-ray-absorbing material 13 in a single step. It is likewise also possible to weld the two layers 3, 8 with a laser. Anodic bonding is also conceivable.

Figure 15:
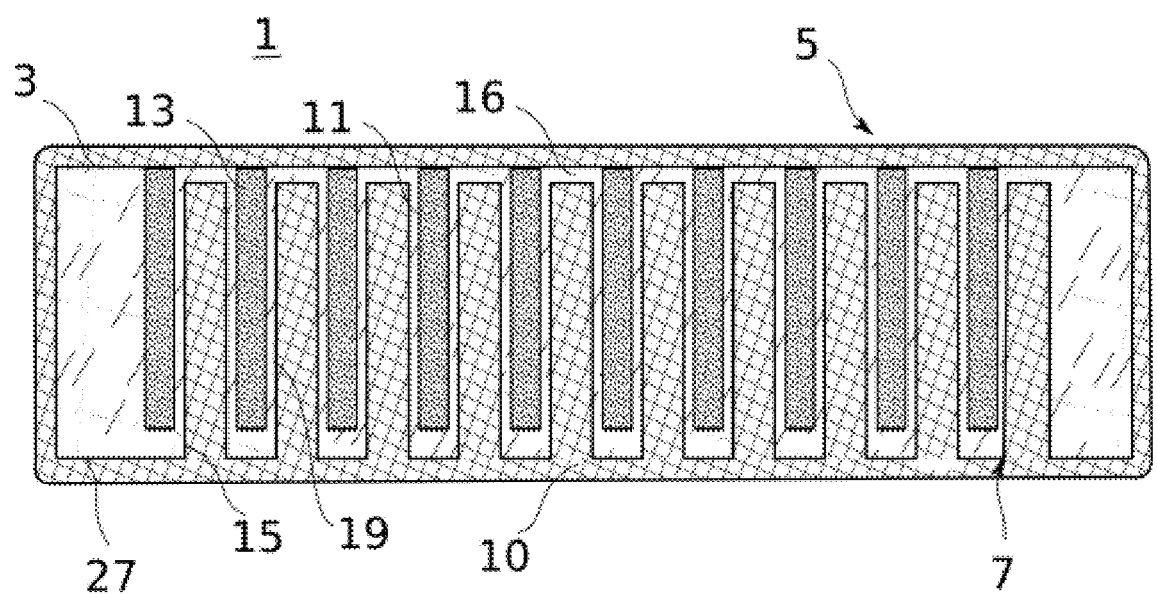
FIG. 15 is a further development of the embodiment shown in FIG. 2.

An alternative or additional further mode of processing of the shielding mesh 1 is the applying of an organic layer or encapsulation, for example by dipping. One example of this is shown by FIG. 15. In this example, the plate 3 of the shielding mesh 1 is completely surrounded by an organic encapsulation 10. The encapsulation 10 may also, as shown, completely or at least partly fill the depressions 15. If the organic material does not have high x-ray absorption, this does not lead to considerable absorption losses within the depressions 15. Suitable organic encapsulations are especially polymers, lacquers, synthetic resins, silicones. By contrast to what is shown, the organic encapsulation 10 may also be applied solely to a portion of the plate 3, for example on the first side 5. In general, in this embodiment, it is thus envisaged that an organic encapsulation 10 is applied over at least part of the plate 3, for example at least part of the surface of the plate 3. This embodiment may of course also be combined with the embodiment with the thin glass plate 8. The organic encapsulation 10 may serve here, for example, as mechanical protection for the plate 3 and especially the thin glass plate 8.

Figure 16:
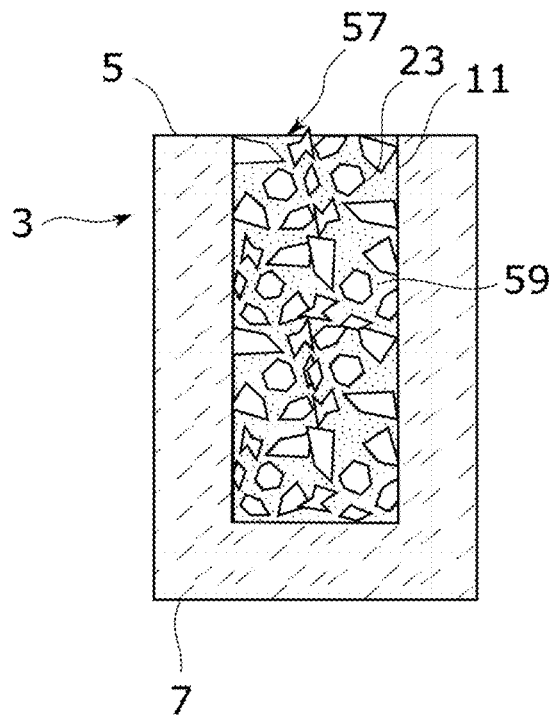
FIG. 16 to FIG. 19 show method steps for filling trenches of the shielding mesh with x-ray-absorbing material.

Described hereinafter are various embodiments for filling of the trenches 11 of the plate 3 with x-ray-absorbing material. FIG. 16 to FIG. 19 show method steps in a first embodiment. For the sake of simplicity, only a section of the plate 3 with a single trench 11 is shown. In order to facilitate the introduction, it is preferable to evacuate the cavities or trenches 11. Then, as shown in FIG. 16, a dispersion 57 comprising the metal particles 23 and a dispersion medium 59 is introduced into the trenches 11. In accordance with the embodiments described further up, the dispersion 57 can generally also be referred to as paste. The dispersion, as well as the metal particles 23, as already described, may also contain other particles, for example glass particles.

Figure 17:
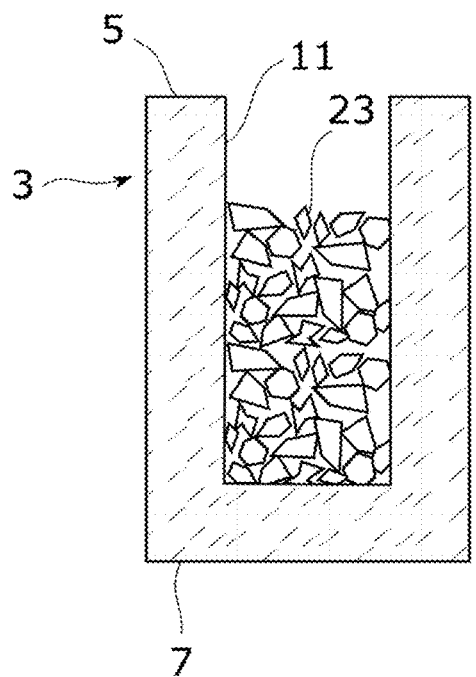
Figure 18:
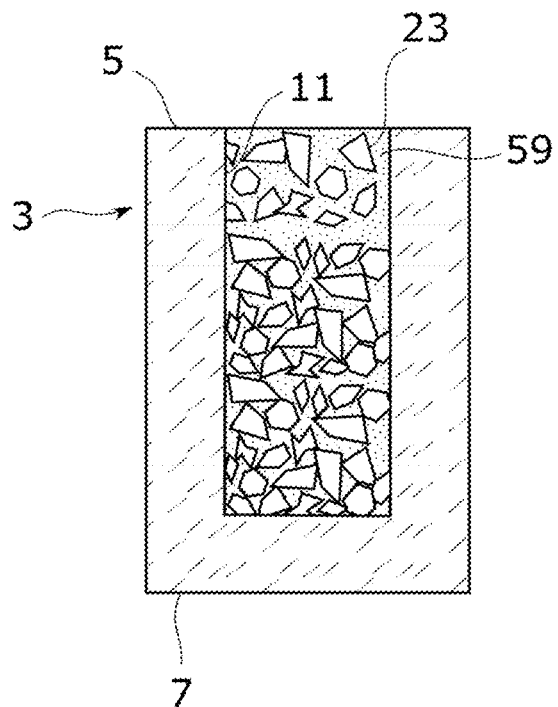
Figure 19:
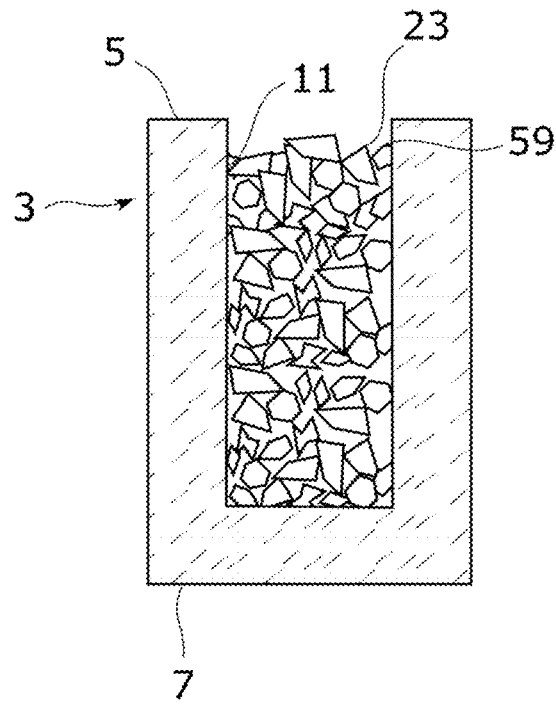

The introduction is preferably effected under pressure, in order to be able to efficiently fill the trenches 11. In a next step, the dispersion 57 is dried, with removal of the dispersion medium 59. The particles separate out as a result and become denser. However, it may be the case, as shown in FIG. 17, that the trenches 11 are not completely filled. Therefore, the process of introducing the dispersion, as shown in FIG. 18, and the drying, or the removing of the dispersion medium, as shown in FIG. 19, may be repeated once or more than once in order to achieve a maximum filling level. In the ideal case, as shown in FIG. 19, this achieves complete filling of the trenches 11 with the particles of the dispersion. Without restriction to the specific examples shown in FIG. 16 to FIG. 19, in one embodiment, a method is thus provided in which the trenches 11 in the plate 3 which is preferably in a reduced-pressure environment, especially under vacuum, are filled with a dispersion 57 comprising a dispersion medium 59 and metal particles 23, the dispersion medium 59 is removed, such that the metal particles 23 settle out, and these two steps are preferably repeated at least once.

Figure 20:
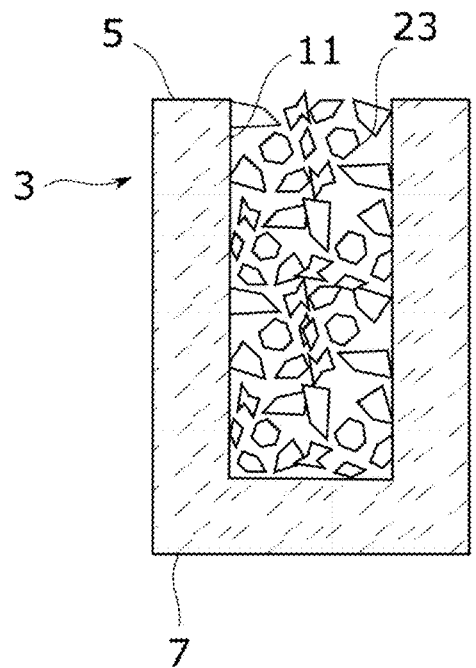
FIG. 20 to FIG. 23 show method steps for filling according to a further embodiment of the production method.
Figure 21:
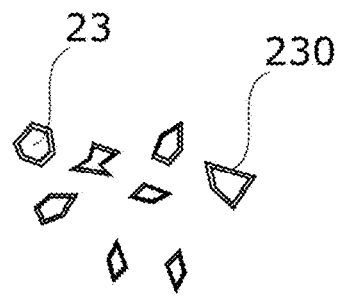
Figure 22:
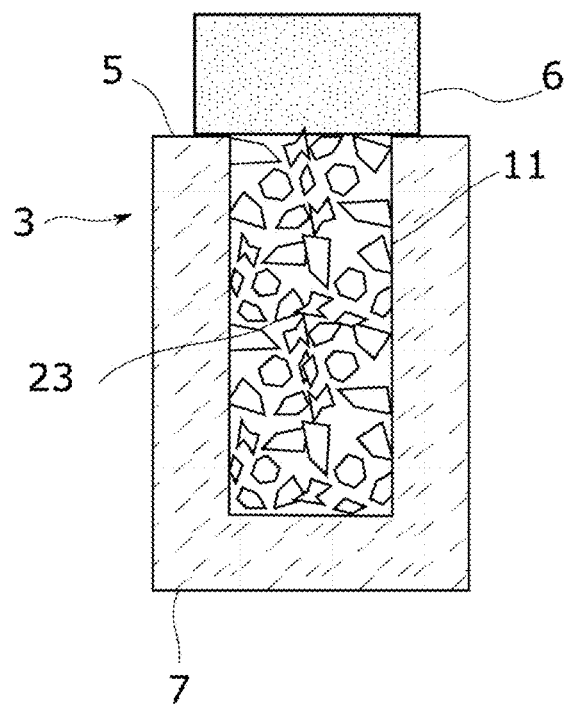
Figure 23:
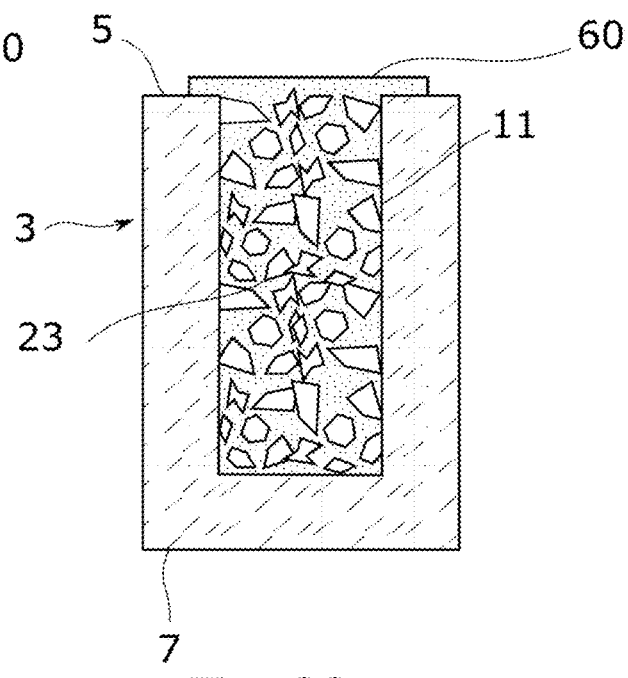

It may nevertheless possibly be the case that there are still cavities in the filling of the trenches 11. Alternatively or additionally to maximum densification of the metal particles 23 in the trenches 11, this problem can also be solved by producing a composite with a further metal that fills the interstices between the particles. In this regard, FIG. 20 to FIG. 23 show method steps for filling in a further embodiment of the production method. First of all, as shown in FIG. 20, the trenches 11 are filled with metal particles 23. The filling may also be effected in accordance with the method described with reference to FIG. 16 to FIG. 19. Subsequently, as shown in FIG. 22, a filling metal 60 is disposed on the side 5 of the plate 3. This is then melted, flows into the trenches 11, and fill the interstices between the metal particles 23. The result is shown by FIG. 23. The filling metal 60 is generally preferably selected such that the melting point thereof is below the transformation temperature $T_g$ of the glass and below the melting temperature of the metal particles 23. In addition, x-ray absorption should also be sufficiently high, in order to improve x-ray contrast with the shielding mesh. In yet a further development, therefore, the filling metal is selected such that it has x-ray absorption at least half as great as the x-ray absorption of tungsten. Therefore, low-melting metals or alloys in particular are suitable for the filling metal, for instance those that contain tin and/or lead. The melting point of the filling metal 60 is preferably below 300° C. Such properties are satisfied by solders inter alia.

In order that the filling metal 60 can flow into the interstices, good wetting of the metal particles 23 is advantageous. In one development, for this purpose, the metal particles 23, as shown in FIG. 21, are provided with a coating 230. For better wetting, for this purpose, the coating 230 may have a higher surface energy than the surface of the metal particles 23. If tungsten or a tungsten-containing alloy is used for the metal particles 23, the metal particles 23 already have very high surface energy, such that good wetting is possible even without a coating 230. The diagram in FIG. 23 shows that a portion of the filling metal 60 remains on the surface of the side 5. This filling metal 60 on the surface may be removed, for example, by polishing. If the metal film is only very thin, it may optionally also remain. In addition, in order to facilitate the removing of the filling metal 60 on the surface, or to avoid any wetting, the surface may be polished on the side 5.

In addition, the filling metal 60 or the metal particles 23 may also be endowed with a flux in order to improve the wetting. In general, the method according to FIGS. 20 to 23 affords an x-ray-absorbing material 13 comprising metal particles 23 embedded into a filling metal 60. In general, the embodiments elucidated with reference to FIGS. 20 to 23 may also result in one or more of the following features of the x-ray-absorbing material 13: The filling metal has a melting point below the melting point of the metal particles 23 and below the transformation temperature $T_g$ of the glass of the plate 3.

Irrespective of whether the metal particles 23 are embedded into a filling metal 60, the metal particles 23 of the x-ray-absorbing material 13 may have a coating 230 having a higher surface energy than the material of the metal particles 23. Such a coating 230 may also serve to increase the free flow of the metal particles 23. This development may also be advantageous particularly in conjunction with the embodiment of FIG. 16 to FIG. 19. Especially suitable for this purpose are silanized metal particles 23. In yet a further development, it is therefore envisaged that the x-ray-absorbing material 13 contains silanized metal particles 23. Such a coating may be deposited, for example, by a CVD process in a plasma. It is also possible to achieve other surface modifications in a plasma. Therefore, in one development of the invention, an x-ray-absorbing material 13 containing metal particles 23 is introduced into the trenches 11, wherein the surface of the metal particles 23 is modified in a plasma. The modifying may be conducted before the introduction, possibly also even only after the filling.

Figure 24:
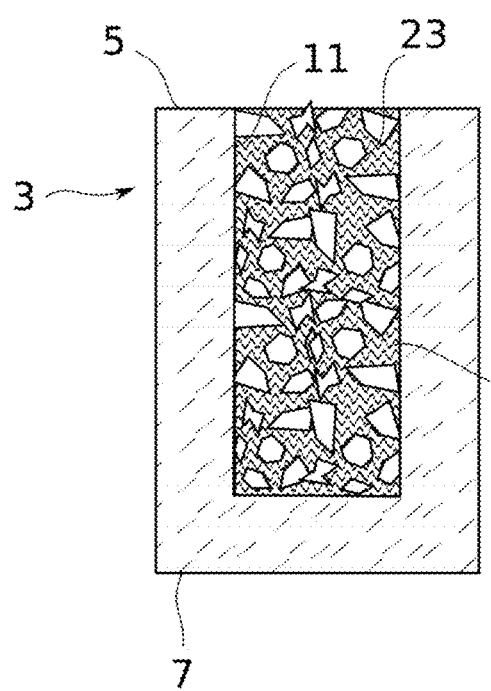
FIG. 24 and FIG. 25 show method steps for filling of interstices in the filling of the trenches.
Figure 25:
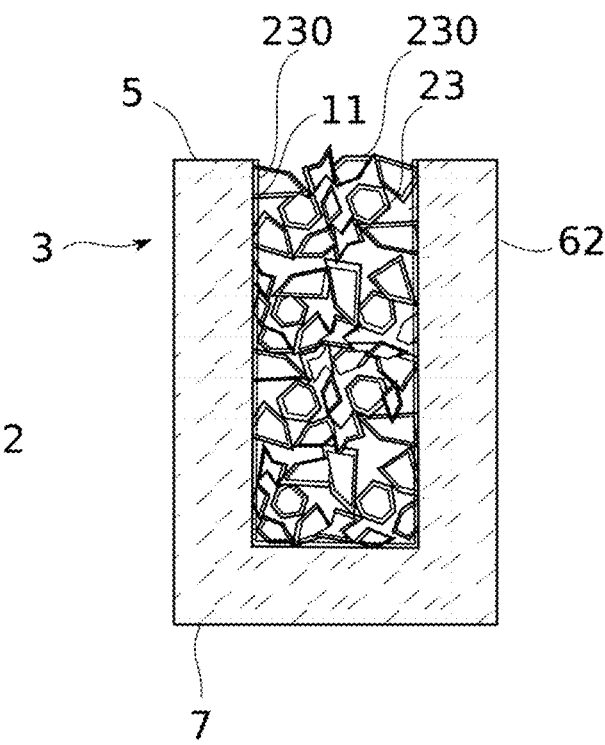

FIG. 24 and FIG. 25 elucidate method steps in a further embodiment, by which the interstices in the filling can be filled or closed.

First of all, the trenches 11 are filled with metal particles 23, as shown in FIG. 20. Subsequently, a metal ink 62 is introduced, which, as shown in FIG. 24, fills the interstices between the metal particles 23. When the metal ink 62 dries, it leaves behind a coating 230 which is metallic or metal-containing on the metal particles 23 and the wall of the trenches 11, as shown in FIG. 25. This process may optionally be repeated once or more than once in order to achieve maximum density of filling. Suitable metals for the coating 230 are in turn those that have high x-ray absorption. Generally, irrespective of the method of the layer deposition, it is envisaged that, for this purpose, in one embodiment, the trenches 11 are filled with x-ray-absorbing material 13 comprising metal particles 23 having a coating 230 that absorbs x-radiation. In this regard, the abovementioned criteria for a material that absorbs x-radiation according to this disclosure are in particular applicable, i.e. a material having a coefficient of x-ray absorption at least a factor of 3 greater than the coefficient of x-ray absorption of the material of the plate for x-radiation having an energy of 69.5 keV and/or a material with a density at least four times greater than the density of the material of the plate and/or a material including at least 10 percent by weight of elements having an atomic number of at least Z=56.

A further means of depositing a coating 230 that absorbs x-radiation on the metal particles 23 and the walls of the trenches 11 is atomic layer deposition, also referred to as the ALD method. This involves alternating introduction of different gaseous precursors that are made to react with the surfaces, which results in deposition of respectively very thin, even monoatomic layers. Very advantageously, it is even possible by this method to deposit tungsten coatings. For this purpose, it is known that $B_2H_6$ or $SiH_4$ can be used as precursors in combination with $WF_6$. Still further methods of depositing x-radiation-absorbing coatings 230 and hence of at least partly filling the interstices between the metal particles 23 are dip coating, for instance for production of ITO or AZO layers, and growth by electroplating. In general, in a development of the various embodiments of the method elucidated by FIG. 24 and FIG. 25, the trenches 11 are thus filled with metal particles 23 and, after the filling, the metal particles 23 are provided with an x-radiation-absorbing coating 230. These method variants can also be combined with other methods described here for filling of the trenches 11, for instance the introduction of a paste containing glass powder. For instance, after the drying of the paste, it would be possible here too to coat the metal particles, or it would be possible to combine various methods layer by layer, such that the trenches 11 include x-radiation-absorbing materials of different structure at different depths. This combinability is equally also applicable to the method variants described hereinafter.

Figure 26:
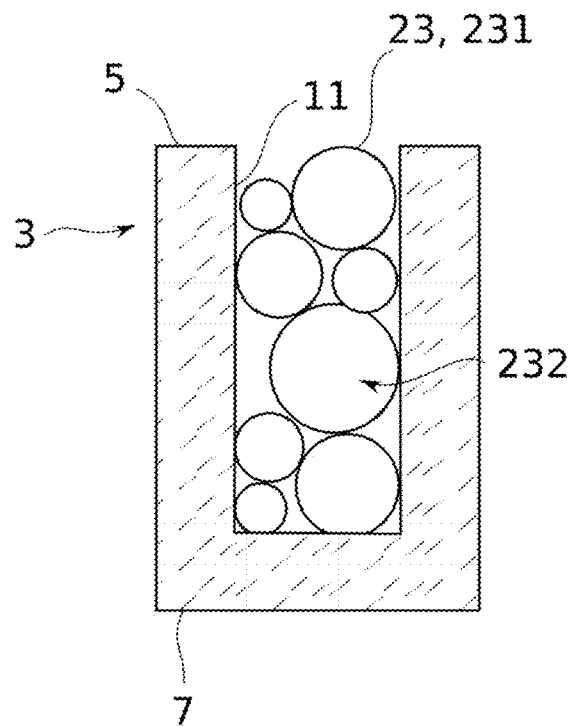
FIG. 26 and FIG. 27 show a variant of the method in which the trenches are filled with metal powders of different grain size and particle shape.
Figure 27:
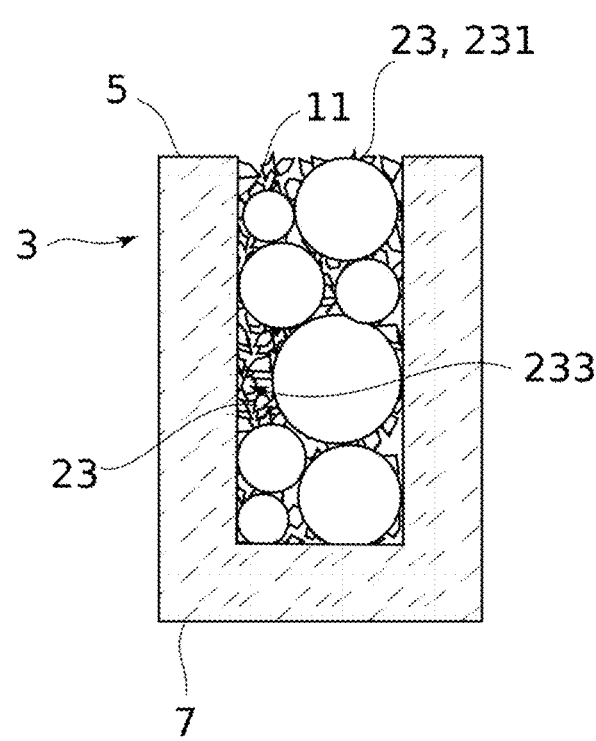

FIG. 26 and FIG. 27 show a further embodiment of a method of filling the trenches 11 with metal particles. In this embodiment, the trenches are filled successively with metal powders 232, 233 of different grain size and particle shape. First of all, as shown in FIG. 26, filling is effected with a metal powder 232 comprising spherical metal particles 231. These are preferably comparatively large, such that large interstices remain between the metal particles. Such spherical metal particles 231 are used, for example, for 3D printing. The spherical shape is helpful in 3D printing in order to establish high flowability and hence the ability to produce very thin layers of loose particles on the object to be printed by drawing-off. This high flowability correspondingly also enables simple filling of the trenches 11. Metal powders for 3D printing with spherical, or at least approximately spherical, metal particles 231 are typically produced by atomization. For this purpose, a gas or liquid jet, typically a water jet, is utilized in order to break up a stream of molten metal into tiny droplets. The at least approximately spherical form of the particles 231, as envisaged in this embodiment, results especially from the aforementioned atomization process. In a second step as shown in FIG. 27, a metal powder 233 is added to the filling, having much smaller metal particles 23 compared to the spherical metal particles 231. These smaller metal particles, on account of the large interstices between the spherical metal particles 231, are capable of efficiently filling these interstices. By contrast to what is shown, the smaller metal particles of the metal powder 233 added later may also be spherical. This is likewise favourable on account of the good flowability of such particles.

Without restriction to particular examples, in relation to the embodiment of FIG. 26, FIG. 27, a shielding mesh 1 with at least one of the following features is provided: the x-ray-absorbing material comprises spherical metal particles 231, the x-ray-absorbing material comprises two metal powders that differ in terms of the particle size of the metal particles 23, 231, where the average particle sizes differ at least by a factor of two, where the larger metal particles 23 are spherical. The x-ray-absorbing material 13 thus has an at least bimodal particle size distribution overall, having two maxima. The corresponding production process is then characterized in that the introducing of the x-ray-absorbing material 13 into the trenches 11 comprises the introducing of a first metal powder 232 with spherical metal particles 231 and then introducing a second metal powder 233, where the metal particles 23 of the second metal powder 233 have a smaller average grain size than the spherical metal particles 231 of the first metal powder 232. This embodiment too, like the other embodiments described herein that relate to the filling of the trenches 11, is independent of the manner in which the trenches 11 are produced in the plate 3.

Figure 28:
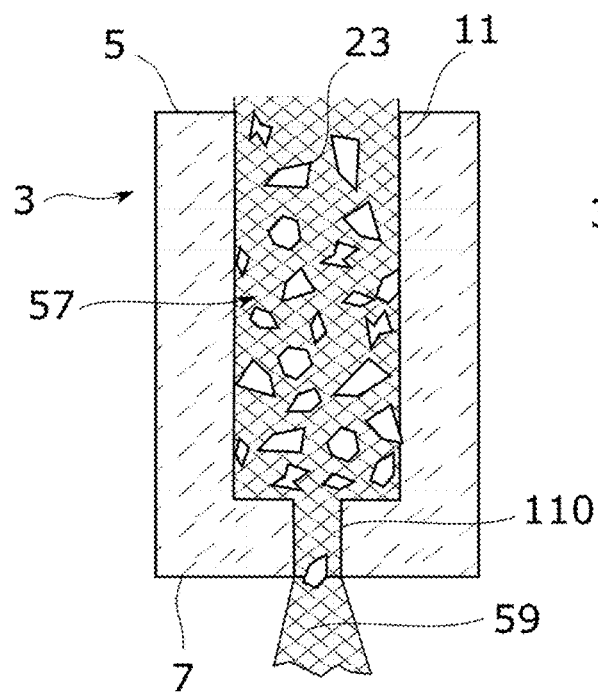
FIG. 28 to FIG. 30 show an embodiment of the filling of the trenches in which a dispersion flows through the trenches.
Figure 29:
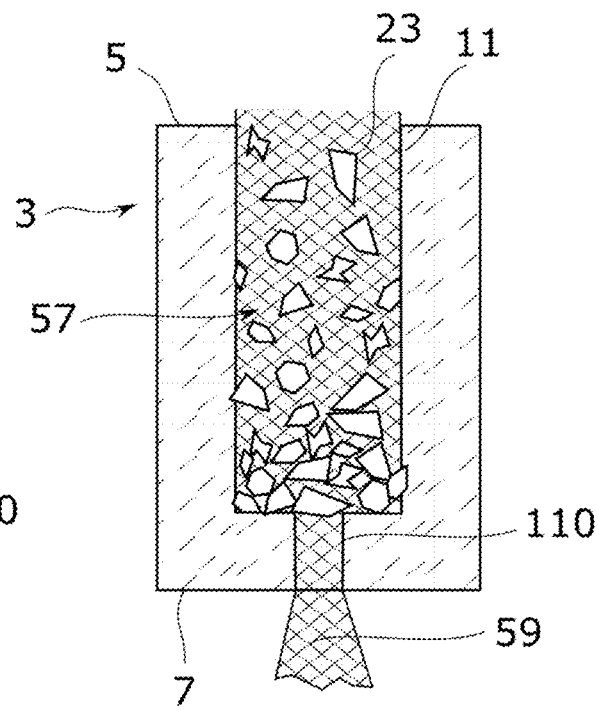
Figure 30:
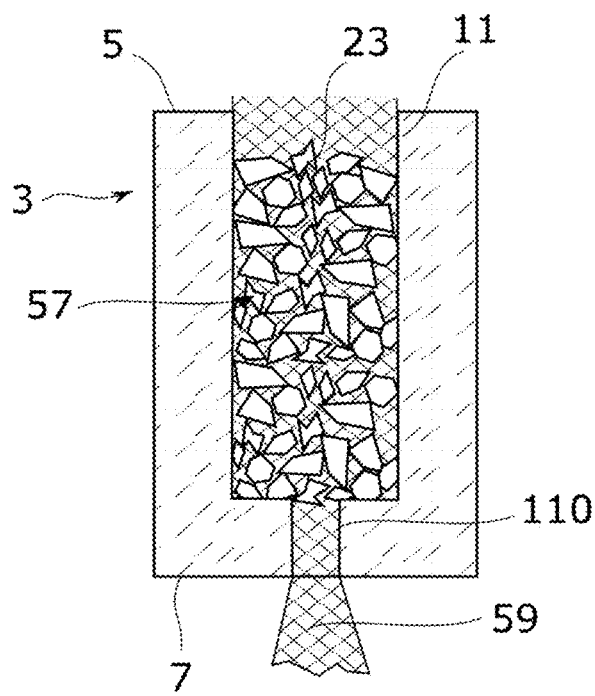

FIG. 28 to FIG. 30 show yet a further embodiment of the filling of the trenches 11. This embodiment too may be combined with other filling methods, for instance the two-stage filling according to FIG. 26, FIG. 27. In the embodiment as elucidated by FIG. 28 to FIG. 30, a paste or dispersion 57 flows through the trenches, with settling or deposition of the metal particles 23 in the trenches 11 as they flow through. In order to be able to perform this type of filling, in one development of the plate 3, the trenches 11 thereof each have a base opening 110. This is a variant of the embodiment already described further above, in which the trenches 11 are at least partly open on both sides 5, 7 of the plate 3.

For filling, a paste having a high proportion of dispersion medium 59, or a dispersion 57, flows through the trenches 11, such that the dispersion medium 59, as shown in FIG. 28, exits again at the base opening 110. At least a portion of the metal particles 23 is too large to get through the base opening 110. This blocks the base opening 110 such that only the dispersion medium 59 can pass through the opening, while the metal particles 23, for example tungsten particles, are filtered out and remain in the trench 11. It may be the case that very small particles do still at first get through the barrier at the base opening 110. This state is shown by FIG. 29. The flow is then continued until the cavity or the trench 11 has been sufficiently filled. The trench 11 filled in this way is shown by FIG. 30. Without restriction to the specific example of FIG. 28 to FIG. 30 for this purpose, in one embodiment of the method, the trenches 11 of the plate 3 are provided with base openings 110, where the cross section of each is less than the cross section of the trench 11, and where a dispersion 57 containing metal particles 23 flows through the trenches 11, such that the dispersion medium 59 of the dispersion 57 exits at the base openings 110, where the metal particles 23 settle out at the base opening 110 and block it to the passage of further metal particles 23, and where the trenches are filled by further flow of the dispersion 57 and settling of the metal particles.

It will be apparent to the person skilled in the art that the invention is not restricted to specific working examples as shown by the figures, but can be varied in various ways in the context of this disclosure. In particular, the various embodiments may also be combined with one another. For instance, the dispersion 57 is shown only with metal particles 23 in FIG. 26 to FIG. 30. The dispersion 57 may, just like in the embodiments of the paste described above, also contain other particles, for instance glass particles. After the filling, these may then be melted as already described in order to solidify the x-ray-absorbing material 13 in the trenches 11 and to firmly bond it to the trenches 11. The production process, especially with regard to the filling of the trenches 11, may additionally also be used for devices other than the x-ray masks described here. For instance, an arrangement of radiation-absorbing trenches may also be used for optical devices, for instance optical fibres that extend in two dimensions. In such a case, it is then also unnecessary for the filling of the trenches 11 to be x-ray-absorbing. Instead, there may be absorption of radiation adapted to the spectral distribution of the radiation. As the case may be, there may also be other properties, for instance high magnetic permeability of the material in the trenches. For instance, in yet another embodiment, at least some of the metal particles may be ferromagnetic. This could be used, for example, for selective inductive heating. In general, therefore, in a further embodiment, a method of producing an element with an arrangement of trenches 11, especially a mesh of crossing trenches, is provided, with the following steps as already specified above: providing a plate 3 with a first side 5 and a second side 7 opposite the first side 5, and producing an arrangement of trenches 11 open toward the first side 5, and introducing a radiation-absorbing material into the trenches 11, wherein the filling is especially effected with a dispersion or paste comprising metal particles 23. The entire disclosure set out here with regard to the shielding mesh, especially also with regard to the production process, the shape and dimensions of the trenches 11, the filling of the trenches, the consolidation, for instance by melting of a glass solder and of the material of the filling, is also applicable here to such other elements having an arrangement of trenches 11.

Figure 31:
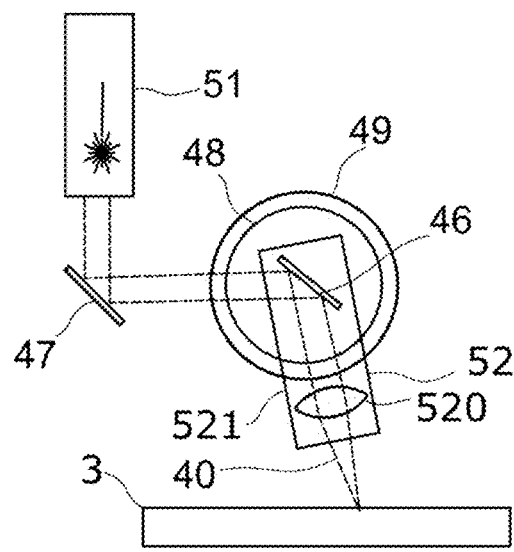
FIG. 31 shows an arrangement for laser processing for the production of the trenches.

Elucidated hereinafter, by way of supplementation of the elucidation of FIG. 6, is a working example by which oblique trenches 11 and depressions 15 are introduced into the plate 3. In this regard, FIG. 31 shows parts of a laser processing device for introduction of filamentous damage into the plate as a development of the embodiment of FIG. 6. Preferably, and without restriction to the example shown, the laser beam 40 is steered onto the plate 3 by means of a rotating mirror 46. More preferably, an additional deflecting mirror 47 is provided, such that the laser 51, as in the example of FIG. 6, emits perpendicularly onto the plate 3. Two rotary devices, preferably turntables 48, 49, symbolized by circles are provided, with which the rotary mirror 46 and the focusing optics 52 are rotatable. The rotary devices are arranged coaxially to one another, such that the axes of rotation thereof coincide. On one of the rotary devices, for example turntable 48, is the rotary mirror 46. The other rotary device, for example turntable 49, rotates the focusing optics, which preferably, as in the example of FIG. 6, comprise a lens 520. In order to direct the laser beam onto the plate at a particular angle $\Theta$, the focusing device 52 is rotated correspondingly by that angle with the turntable 49, while the rotary mirror 46 with the turntable 48 is rotated by half the angle in the same direction. The coupling of the two rotations may be mechanical or else electronic. In addition, as in the example of FIG. 6 the adjustment of the site of incidence on the plate 3 can be undertaken with a positioning device 53, which is not shown in FIG. 31 for the sake of simplicity.

In one working example, the (focusing) lens 520 is in biconvex form and has high spherical aberration, or the imaging optics overall have high spherical aberration. In this way, an elongated focus in the form of a focal line is formed. The lens 520 may also be correspondingly aspherical or even in the form of an axicon lens. In one variant, the transversal intensity profile of the laser beam 40 is additionally formed, such that it has a transversal "top-shape" profile, i.e. the variance in intensity is less than 30%, preferably less than 25%, preferably less than 20%, more preferably less than 10%, from the average intensity over the range covered by a distance of 70%, preferably 80%, more preferably 85%, of the $1/e^2$ beam diameter of the laser beam. In a further working example, the intensity along the elongated focal line formed by the focusing lens 520 is in a "top-shaped" distribution along the optical axis with the parameters cited above. The turntable 49 may be pivoted about the perpendicular direction of incidence within an angle range of $-40°$ to $+90°$. The focal length of the focusing optics 52, especially the lens 520, is within a range from 8 mm to 30 mm, preferably within a range from 10 mm to 24 mm, where the focus, or the centre thereof in beam direction, is within the plate 3. The beam diameter before focusing is within a range of 8 mm to 18 mm, preferably 12 mm. In one working example, the processing of the plate 3 made of glass is conducted with the following parameters: the wavelength is within a range of 1000 nm to 1100 nm; it is optionally possible, especially by means of frequency doubling, to choose a wavelength within a range of 500 nm to 600 nm. The pulse duration is within a range of 0.3 ps to 10 ps. The repetition rate of the laser pulse is 30 kHz to 100 kHz. The laser is operated in burst mode with 1 to 8, preferably 2 to 4, pulses per burst. The pulse energy is within a range of 50 to 500 mJ, preferably within a range of 50 µJ to 50 mJ, more preferably within a range of 1000 to 10 mJ. The plate 3—depending on the geometry to be produced—is scanned at a rate of 100 mm/s-500 mm/s. A favourable distance between the filamentous damage or modifications is within a range of 2 µm to 20 µm, preferably within a range of 3 µm to 10 µm.

After the filamentous damage or modifications have been introduced, the plate 3 is subjected to an etching process in order to elaborate the trenches 11 and depressions 15. The etching may optionally be preceded by thermal treatment in order to dissipate stresses in the material. This annealing is effected in the region of the glass transition temperature $T_g$, especially slightly above it, for example at $T_g+20°$ C. In one example, the temperature in the heat treatment is 545° C., with a glass transition temperature of 525° C. The plate 3 is then exposed to an acidic or preferably alkaline etch medium, specifically a KOH solution. The KOH concentration here is within a range of 4 mol/l to 22 mol/l, preferably within a range of 12 mol/l to 18 mol/l. The etching is effected at a temperature of 60° C. to 100° C. This achieves an etch rate of less than 0.5 µm per hour to 8 µm per hour. In order to elaborate the trenches 11 and depressions 15, the duration of the etching process is generally 2 to 12 hours, typically 4 to 8 hours. The etching process can be assisted by ultrasound agitation.

LIST OF REFERENCE NUMERALS

| | |
|---|---|
| 1 | Shielding mesh |
| 2 | Imaging x-ray device |
| 3 | Plate |
| 5 | First side of 3 |
| 7 | Second side of 3 |
| 8 | Thin glass plate |
| 9 | Mesh |
| 10 | Organic encapsulation |
| 11 | Trench |
| 12 | Channel |
| 13 | X-radiation-absorbing material . . . |
| 15 | Depression |
| 16 | Base wall of 15 |
| 17 | Centre axis of 15 |
| 18 | Point source |
| 19 | Wall between 11, 15 |
| 21 | Glass solder |
| 23 | Metal particles |
| 25 | Wall of 11 |
| 27 | Edge region of 1 |
| 30 | X-ray tube |
| 31 | Anode |
| 32 | Cathode |
| 33 | Vacuum envelope |
| 34 | Object |
| 35 | X-ray beam |
| 36 | Scattered x-ray beam |
| 39 | Detector |
| 40 | Laser beam |
| 41 | Filamentous damage |
| 43 | First group of filamentous damage 41 |
| 44 | Second group of filamentous damage 41 |
| 45 | Etch medium |
| 46 | Rotary mirror |
| 47 | Deflecting mirror |
| 48, 49 | Turntable |
| 50 | Laser processing device |
| 51 | Ultrashort pulse laser |
| 52 | Focusing optics |
| 53 | Positioning device |
| 54 | Point of incidence of 40 |
| 55 | Computation device |
| 57 | Dispersion |
| 59 | Dispersion medium |
| 60 | Filling metal |
| 62 | Metal ink |
| 110 | Base opening in 11 |
| 230 | Coating |
| 231 | Spherical metal particle |
| 232, 233 | Metal powder |
| 520 | Lens |
| 521 | Tube |

What is claimed is:

1. A shielding mesh to counter scattered ionizing radiation, comprising:
a plate having a first side and a second side opposite the first side;
an arrangement of depressions in the plate that are open toward the second side;
a mesh of trenches in the plate that are open toward the first side; and
an x-ray-absorbing material in the mesh of trenches, wherein the mesh of trenches and arrangement of depressions are configured so that a wall of the plate remains between the arrangement of depressions and the mesh of trenches.

2. The shielding mesh of claim 1, wherein the plate is a glass plate.

3. The shielding mesh of claim 1, further comprising a feature selected from a group consisting of: the mesh of trenches have a ratio of width to depth of at least 40:1; the mesh of trenches have a depth that is at least 1.5 millimetres; the wall has an angle that differs by less than 5° from a center axis; the mesh of trenches comprise two adjacent trenches that have a middle-to-middle distance that is less than a depth of the two adjacent trenches; the mesh of trenches comprise two adjacent trenches that have a middle-to-middle distance that is less than a depth of the two adjacent trenches by at least a factor of three; the mesh of trenches have a width that differs from a width of the arrangement of depressions by not more than a factor of 2; the mesh of trenches have a width that is not more than 100 μm; the mesh of trenches have a width that is not more than 50 μm; and any combinations thereof.

4. The shielding mesh of claim 1, wherein the arrangement of depressions and/or the mesh of trenches have a center axis that is directed toward a common virtual point source.

5. The shielding mesh of claim 1, wherein the x-ray-absorbing material comprises a feature selected from a group consisting of: a partly or fully molten glass; a lead-containing glass; a bismuth-containing glass; particles embedded in a partly or fully molten material; particles embedded in a partly or fully molten glass; metal particles; mineral particles; ceramic particles; a density of at least 9 g/cm$^3$; a density of at least 11 g/cm$^3$; a density that is at least four times greater than a density of a material of the plate; at least 10 percent by weight of elements having an atomic number of at least Z=56; at least 25 percent by weight of elements having an atomic number of at least Z=56; particles of a tungsten-containing material; particles of metallic tungsten; particles of a tungsten alloy; particles of a tungsten-containing mineral; particles of a tungsten-containing ceramic; a difference in a coefficient of linear thermal expansion of the x-ray absorbing material and a material of the plate that is less than 3 ppm/K; a filling level of the x-ray-absorbing material in the mesh of trenches that is at least 40% by volume; a filling level of the x-ray-absorbing material in the mesh of trenches that is at least 60% by volume; a glass of the x-ray-absorbing material has a glass transition temperature that is at least 160° C. lower than a glass transition temperature of a glass of the plate; a glass of the x-ray-absorbing material has a glass transition temperature that is at least 220° C. lower than a glass transition temperature of a glass of the plate; a glass of the x-ray-absorbing material has a processing temperature at which a viscosity thereof is 104 dPa·s that is at least 100° C. lower than a processing temperature of a glass of the plate; a glass of the x-ray-absorbing material has a processing temperature lower than a temperature of a softening point of a glass of the plate, wherein the softening point is defined by a viscosity of 1076 dPa·s; a particle with a coefficient of linear thermal expansion that is less than 1 ppm/K or negative in at least one part of a temperature range between 0° C. and 200° C.; and any combinations thereof.

6. The shielding mesh of claim 1, wherein the mesh of trenches are at least partly open toward the second side.

7. The shielding mesh of claim 1, wherein the mesh of trenches have a base opening.

8. The shielding mesh of claim 1, wherein the x-ray-absorbing material comprises a feature selected from a group consisting of: particles comprising a mixture of at least two powders with different d50 values; particles comprising a mixture of at least two metal powders with different d50 values; particles comprising a mixture of at least two mineral powders with different d50 values; particles comprising a mixture of at least two ceramic powders with different d50 values; particles having a particle size distribution for which the exponent n of an Andreasen distribution of particle diameters d fitted to a particle size distribution of the metal particles, $$F(d) = 100 * \left(\frac{d}{d_{max}}\right)^n$$

is less than n=0.33, where $d_{max}$ is the maximum particle diameter of the fitted Andreasen distribution; particles having a particle size distribution for which the exponent n of an Andreasen distribution of particle diameters d fitted to a particle size distribution of the metal particles, $$F(d) = 100 * \left(\frac{d}{d_{max}}\right)^n$$

is less than n=0.28, where $d_{max}$ is the maximum particle diameter of the fitted Andreasen distribution; particles having a particle size distribution that is bimodal; particles having a particle size distribution that is multimodal; metal particles embedded in a filler metal that has a melting point below a melting point of the metal particles and below a transformation temperature of a glass of the plate; metal particles having a coating that has a higher surface energy than a material of the metal particles; metal particles having a coating that absorbs x-radiation; silanized metal particles; spherical metal particles; two metal powders that differ in terms of particle size by a factor of at least two; two metal powders that differ in terms of particle size with larger metal particles being spherical; and any combinations thereof.

9. The shielding mesh of claim 1, further comprising a second glass plate secured on at least one of the first and second sides.

10. The shielding mesh of claim 1, further comprising an organic encapsulation on at least one of the first and second sides.

11. An imaging x-ray device, comprising
an x-ray detector configured to detect x-radiation;
an x-ray source; and
a shielding mesh between the x-ray detector and the x-ray source, wherein the shielding mesh comprises:
  a plate having a first side and a second side opposite the first side;
  an arrangement of depressions in the plate that are open toward the second side;
  a mesh of trenches in the plate that are open toward the first side; and
  an x-ray-absorbing material in the mesh of trenches, wherein the mesh of trenches and arrangement of depressions are configured so that a wall of the plate remains between the arrangement of depressions and the mesh of trenches.

12. A method of producing a shielding mesh to counter scattered x-radiation, comprising:
providing a plate having a first side and a second side opposite the first side;
irradiating the plate with a laser beam, the material of the plate being is transparent to the laser beam such that the laser beam penetrates into the plate and causes a first group of filamentous damage on the first side;
irradiating the plate with the laser beam such that the laser beam penetrates into the plate and causes a second group of filamentous damage on the second side;
removing material of the plate in the region of the second group of filamentous damage by etching the plate with an etch medium so that an arrangement of depressions open toward the second side of the plate are formed;
removing material of the plate in the region of the first group of filamentous damage by etching the plate with the etch medium so that a mesh of trenches open toward the first side is formed; and
introducing an x-ray-absorbing material into the mesh of trenches.

13. The method of claim 12, wherein the step of introducing the x-ray-absorbing material into the mesh of trenches comprises:
melting a mixture of pulverulent glass with particles and introducing the mixture into the trenches; and
allowing the mixture to solidify so that the x-ray-absorbing material sticks to walls of the mesh of trenches.

14. The method of claim 12, wherein the irradiating steps comprise irradiating the plate with the laser beam such that the laser beam penetrates into the plate at least partly obliquely to the first side and/or the second side.

15. The method of claim 12, wherein the irradiating steps comprise irradiating the plate with the laser beam from the first side to produce both the first group of filamentous damage and the second group of filamentous damage by altering a focal point and a direction of the laser beam relative to the plate.

16. The method of claim 12, wherein the step of introducing the x-ray-absorbing material into the mesh of trenches comprises:
introducing a paste containing glass particles and metal particles into the mesh of trenches;
heating such that the glass particles soften; and
allowing the glass particles to solidify such that the x-ray-absorbing material comprises the metal particles embedded into glass.

17. The method of claim 12, wherein the step of introducing the x-ray-absorbing material into the mesh of trenches comprises:
filling the mesh of trenches with metal particles; and
coating the metal particles with an x-ray-absorbing coating.

18. The method of claim 12, wherein the step of introducing the x-ray-absorbing material into the mesh of trenches comprises:
introducing of a first metal powder comprising spherical metal particles into the mesh of trenches; and
introducing a second metal powder into the mesh of trenches, wherein the second metal powder comprises metal particles that have a smaller average particle size than the spherical metal particles of the first metal powder.

* * * * *